(12) United States Patent
Wax et al.

(10) Patent No.: US 8,014,366 B2
(45) Date of Patent: Sep. 6, 2011

(54) WLAN CAPACITY ENHANCEMENT USING SDM

(75) Inventors: Mati Wax, Haifa (IL); Ruby Tweg, Misgav (IL); Aviv Aviram, Haifa (IL); Evgeni Levitan, Haifa (IL); Amit Freiman, Haifa (IL); Einat Ofir-Arad, Misgav (IL); Hovav Elzas, Raanana (IL); Alex Podyetsky, Kiryat Yam (IL); Avi Vaknin, Atlit (IL); Yael Shavit, Haifa (IL)

(73) Assignee: Wavion Ltd., Yokneam (IL)

( * ) Notice: Subject to any disclaimer, the term of this patent is extended or adjusted under 35 U.S.C. 154(b) by 2154 days.

(21) Appl. No.: 10/917,996

(22) Filed: Aug. 13, 2004

(65) Prior Publication Data
US 2005/0047384 A1 Mar. 3, 2005

Related U.S. Application Data

(60) Provisional application No. 60/498,510, filed on Aug. 27, 2003.

(51) Int. Cl.
*H04W 4/00* (2009.01)
(52) U.S. Cl. ............... 370/338; 455/516; 455/567.1; 455/562.1; 370/328
(58) Field of Classification Search ........... 370/328–338
See application file for complete search history.

(56) References Cited

U.S. PATENT DOCUMENTS

| 5,491,723 | A  | * | 2/1996 | Diepstraten ............. 375/267 |
| 6,067,290 | A  |   | 5/2000 | Paulraj et al. |
| 6,240,098 | B1 |   | 5/2001 | Thibault et al. |
| 7,095,709 | B2 | * | 8/2006 | Walton et al. ............. 370/208 |
| 7,352,718 | B1 | * | 4/2008 | Perahia et al. ............ 370/329 |
| 7,366,103 | B2 | * | 4/2008 | Engwer et al. ............ 370/252 |
| 2003/0100343 | A1 | * | 5/2003 | Zourntos et al. ........... 455/562 |
| 2004/0028121 | A1 |   | 2/2004 | Fitton |
| 2010/0220693 | A1 | * | 9/2010 | Ho ......................... 370/336 |

FOREIGN PATENT DOCUMENTS

| EP | 0 926 912 | 6/1999 |
| EP | 0 926 916 | 6/1999 |
| WO | WO 96/22662 | 7/1996 |
| WO | WO 04/010573 | 1/2004 |

OTHER PUBLICATIONS

Moghadam Kaveh, "A CDMA Interference Canceling Receiver with an Adaptive Blind Array", IEEE J. Selected Areas, Communications, vol. JSAC-16, No. 8, Oct. 1998, pp. 1542-1554.

(Continued)

*Primary Examiner* — Kamran Afshar
*Assistant Examiner* — Sayed T Zewari
(74) *Attorney, Agent, or Firm* — D. Kligler I.P. Services Ltd

(57) ABSTRACT

A method for communication over a wireless local area network (WLAN) includes receiving uplink signals from a plurality of stations in the WLAN. Responsively to the uplink signals, a set of the stations is selected for inclusion in a spatial multiplexing group. Downlink signals are transmitted simultaneously to the stations in the set using spatial division multiplexing (SDM).

108 Claims, 13 Drawing Sheets

OTHER PUBLICATIONS

Cao Yuan, et al., "A New Scheme for DS-CDMA Detection Combining Smart Antennas and Parallel Interference Canceller", Communication Technology Proceedings, 2000, WCC-ICCT 2000, International Conference on Beijing, China Aug. 21-25, 2000, pp. 156-159.

Nazar S N et al., "An Adaptive Parallel Interference Canceler Using Adaptive Blind Arrays", VTC 2002-Fall, 2002 IEEE 56$^{th}$, Vehicular Technology Conference Proceedings, Vancouver, Canada, Sep. 24-28, 2002.

Je Gil Koo Ed, Institute of Electrical and Electronics Engineers: "Performance analysis of an iterative group-wise parallel interference cancellation for multiuser detection of coherent W-CDMA stsem", Globecom'02, 2002—IEEE Global Telecommunications Conference, Conference proceedings, Taipei, Taiwan, Nov. 17-21, 2002.

ANSI/IEEE Standard 802.11, Part 11: Wireless LAN Medium Access Control (MAC) and Physical Layer (PHY) Specifications, 1999.

U.S. Appl. No. 60/498,510, filed Aug. 27, 2003.
U.S. Appl. No. 60/556,262, filed Mar. 24, 2004.

* cited by examiner

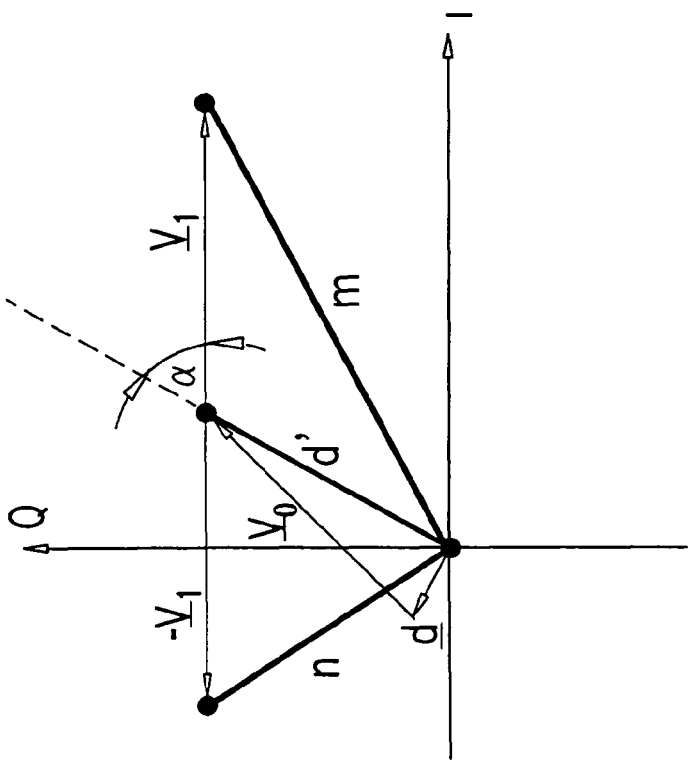
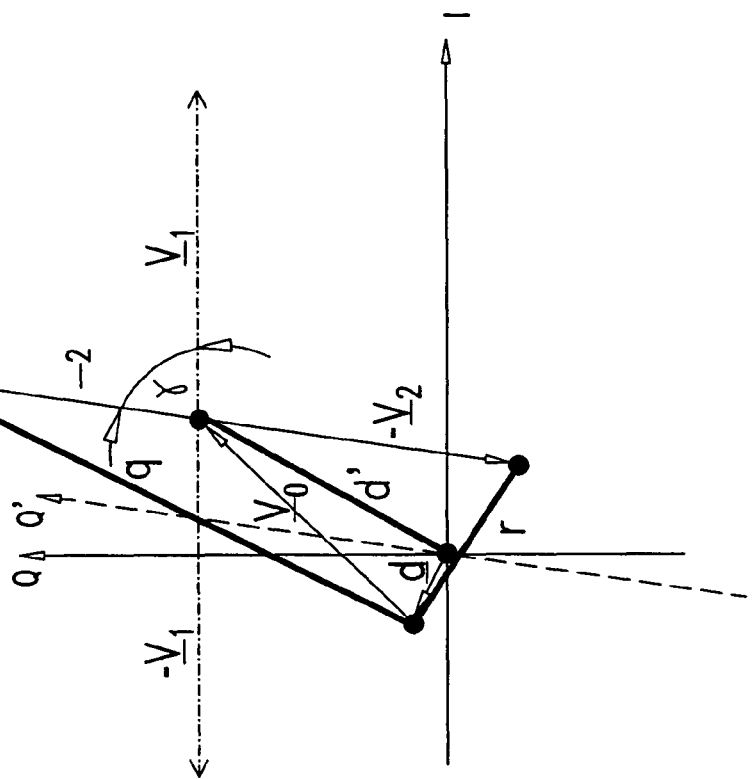
FIG. 8A
FIG. 8B

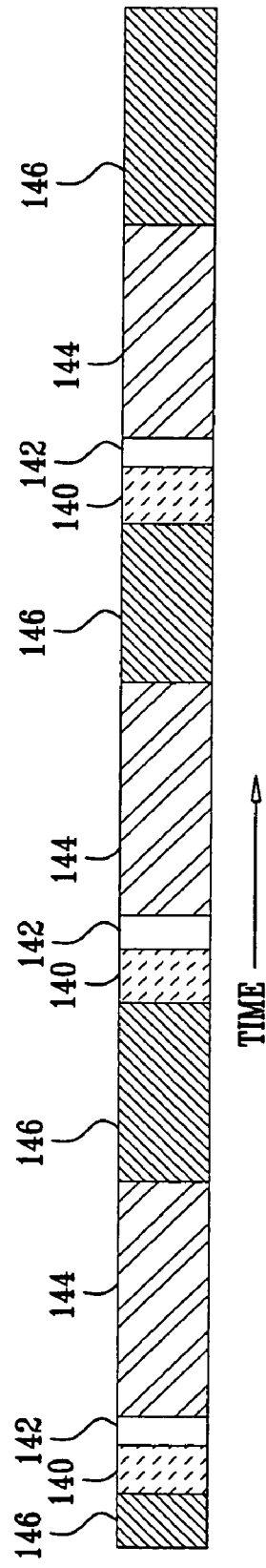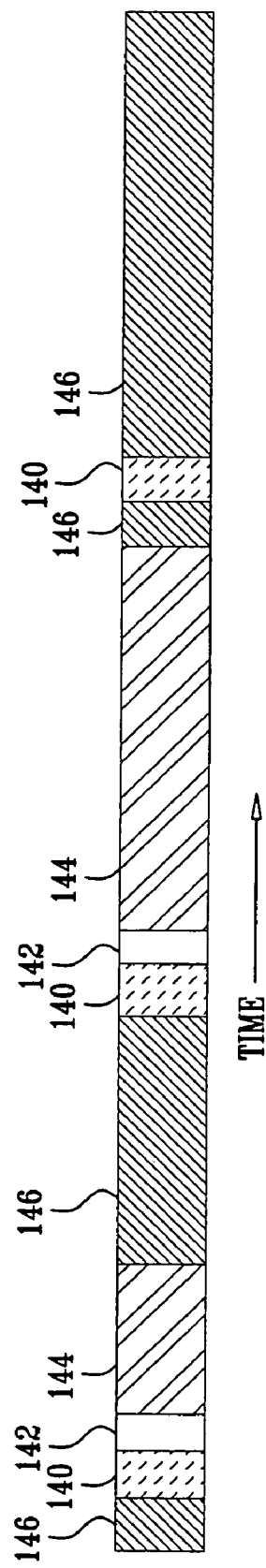

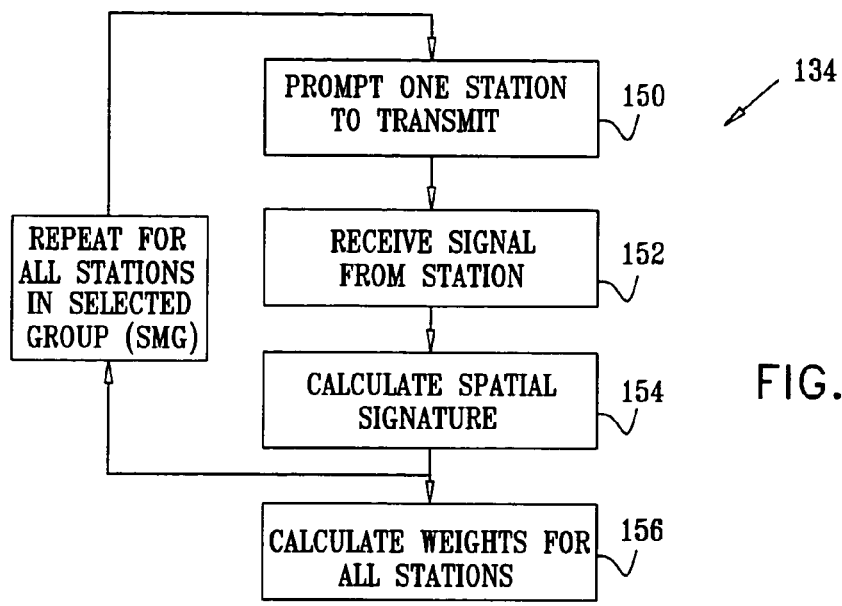
FIG. 11
FIG. 12
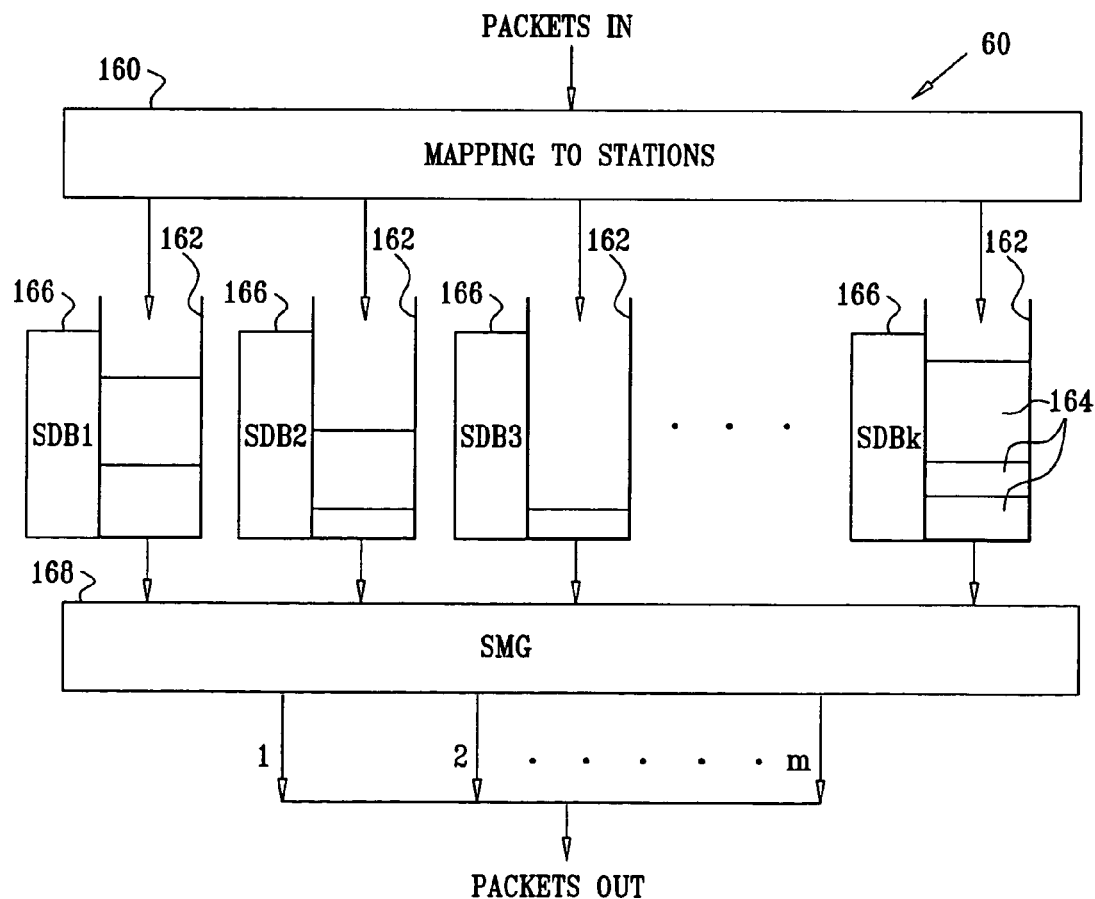

WLAN CAPACITY ENHANCEMENT USING SDM

CROSS-REFERENCE TO RELATED APPLICATION

This application claims the benefit of U.S. Provisional Patent Application 60/498,510, filed Aug. 27, 2003, which is incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and the demand for WLAN bandwidth is growing. The original WLAN standards, such as IEEE 802.11, were designed to enable communications at 1-2 Mbps in a band around 2.4 GHz. More recently, IEEE working groups have defined the 802.11a, 802.11b and 802.11g extensions to the original standard, in order to enable higher data rates. The 802.11a standard, for example, provides data rates up to 54 Mbps over short distances in a 5 GHz band using a multi-tone, orthogonal frequency domain multiplexing (OFDM) scheme. The 802.11b standard defines data rates up to 11 Mbps using a single-carrier modulation scheme in the 2.4 GHz band. The newer 802.11g standard permits data rates up to 54 Mbps in the 2.4 GHz band using OFDM, and is also backward-compatible with legacy 802.11b products. In the context of the present patent application and in the claims, the term "802.11" is used to refer collectively to the original IEEE 802.11 standard and all its variants and extensions, unless specifically noted otherwise.

In 802.11 WLANs, a fixed access point communicates on a predefined frequency channel with wireless mobile stations (also referred to simply as "stations") in its vicinity. The group of stations communicating with the same access point is referred to as a basic service set (BSS). Generally, with the exception of certain broadcast messages, the access point can transmit downlink signals only to one station at a time. Otherwise, the stations would receive multiple, interfering signals, which they would then be unable to decode. Similarly, to prevent simultaneous uplink transmissions, the 802.11 standard provides a contention avoidance mechanism, which requires a station to refrain from transmitting when it senses other transmissions on its frequency channel.

SUMMARY OF THE INVENTION

Embodiments of the present invention provide methods and devices for enhancing the capacity of a WLAN by spatial division multiplexing (SDM). This technique permits an access point to transmit respective downlink signals simultaneously to multiple stations in a spatial multiplexing group (SMG), and to receive uplink signals simultaneously from the stations in the group. For this purpose, the access point comprises multiple antennas and a SDM beamforming circuit, which generates a specific beam pattern for each of the stations so as to maximize the signal power while suppressing interference from other signals.

In some embodiments of the present invention, a space-time scheduler (STS) selects the set of stations to be included together in the SMG. The STS may define multiple, different SMGs to be served by the access point at different times. Typically, the SMG members are selected based on the uplink signals received by the access point from the stations that it serves. For example, the STS may group together stations having similar uplink power levels but different spatial signatures. Other criteria may also be applied.

Access points used in embodiments of the present invention may comprise simple, off-shelf radio transceiver hardware, wherein one such transceiver is coupled to each of the antennas. In such embodiments, calibration procedures may be used to compensate for defects and differences in the response characteristics of the transceivers, so as to enhance the quality of the signals received and transmitted by the access points. In these calibration procedures, one or more of the transceivers transmit calibration signals through their respective antennas, and one or more other transceivers receive the calibration signals. The received signals are measured and processed in order to determine calibration factors that are subsequently applied to the actual communication signals that are transmitted and received by the transceivers. Additionally or alternatively, the access point may apply phase tracking and compensation to achieve pseudo-coherent operation of the transceivers, notwithstanding incoherence of the respective local oscillators in the transceivers. These aspects of the present invention are useful not only in the context of SDM, but also in improving communication performance between an access point and a single mobile station by multi-antenna techniques, such as beamforming.

There is therefore provided, in accordance with an embodiment of the present invention, a method for communication over a wireless local area network (WLAN), including:

receiving uplink signals from a plurality of stations in the WLAN;

responsively to the uplink signals, selecting a set of the stations for inclusion in a spatial multiplexing group; and transmitting downlink signals simultaneously to the stations in the set using spatial division multiplexing (SDM).

In disclosed embodiments, selecting the set of the stations includes processing the uplink signals to determine respective spatial signatures of the stations, and grouping the stations in the set responsively to the spatial signatures. Typically, transmitting the downlink signals includes calculating respective beamforming weights for the stations in the set responsively to the respective spatial signatures, and applying the beamforming weights to the downlink signals. In some embodiments, calculating the respective beamforming weights includes computing receive beamforming weights and transmit beamforming weights, wherein the transmit beamforming weights are applied to the downlink signals, and wherein receiving the uplink signals includes applying the receive beamforming weights to the uplink signals. In one embodiment, receiving the uplink signals includes receiving first and second uplink signals simultaneously from at least first and second stations in the spatial multiplexing group, and applying the receive beamforming weights includes using the beamforming weights to separate and demodulate the first and second uplink signals simultaneously.

Additionally or alternatively, grouping the stations includes selecting the stations for inclusion in the group such that there is a substantial difference between the respective spatial signatures of all the stations in the group.

Typically, receiving the uplink signals includes measuring respective power levels of the uplink signals, and selecting the set of the stations includes grouping the stations in the set responsively to the power levels. In a disclosed embodiment, grouping the stations includes selecting a first station having a first power level, and selecting at least a second station so that the respective power levels of the uplink signals of all the stations in the set are within a predefined bound of the first power level.

Additionally or alternatively, transmitting the downlink signals includes placing data packets in respective queues for transmission to the stations, and selecting the set of the stations includes grouping the stations in the set responsively to a characteristic of the respective queues. In a disclosed embodiment, the queues have respective lengths, and grouping the stations includes selecting a first station having a first queue length, and selecting at least a second station so that the respective queue lengths of all the stations in the set are within a predefined bound of the first queue length.

Further additionally or alternatively, the data packets have respective packet lengths, and grouping the stations includes selecting a first station having a first packet for transmission having a first packet length, and selecting at least a second station so that the respective packet lengths of the packets to be transmitted to all the stations in the set are within a predefined bound of the first packet length.

Still further additionally or alternatively, selecting the set of the stations includes assigning respective priorities to the queues, and choosing at least one of the stations for inclusion in the group responsively to the priorities. Typically, assigning the respective priorities includes calculating the priorities responsively to at least one of a load of the queues, an age of a first packet, and a length of a first packet in each of the queues.

In some embodiments, transmitting the downlink signals includes determining respective transmission rates for the stations responsively to the uplink signals, and selecting the set of the stations includes grouping the stations in the set responsively to the respective transmission rates. In one embodiment, selecting the set of the stations includes determining a number of the stations to be included in the set, and determining the respective transmission rates includes setting the respective transmission rates responsively to the number of the stations in the set.

Typically, transmitting the downlink signals includes calculating beamforming weights responsively to the uplink signals, and applying the beamforming weights to the downlink signals. In a disclosed embodiment, calculating the beamforming weights includes calculating first beamforming weights for application to the uplink signals and second beamforming weights for application to the downlink signals, and receiving the uplink signals includes applying the first beamforming weights so as to enhance reception of the uplink signals.

In a disclosed embodiment, selecting the set of the stations includes selecting a first set of the stations for inclusion in a first spatial multiplexing group, to which the downlink signals are to be transmitted during a first period, and the method includes selecting a second set of the stations for inclusion in a second spatial multiplexing group, and transmitting the downlink signals simultaneously to the stations in the second set using the SDM during a second period, subsequent to the first period.

In a further embodiment, receiving the uplink signals includes permitting the stations in the WLAN to transmit uplink signals during a first operating period, subject to a collision-avoidance mechanism provided by a standard applicable to the WLAN, and transmitting the downlink signals includes transmitting a broadcast message from an access point to the stations in the WLAN so as to disable transmission of the uplink signals, thereby terminating the first operating period, and transmitting the downlink signals simultaneously to the stations in the set using SDM during a second operating period immediately following the broadcast message.

Typically, receiving the uplink signals includes receiving uplink signals at an access point in the WLAN via multiple antennas that are coupled to the access point, finding respective correlations between respective sequences of samples of the uplink signals received by the antennas and a known preamble of a packet carried by the uplink signals, and combining the respective correlations from the plurality of the antennas so as to recover a timing of the uplink signals. Additionally or alternatively, receiving the uplink signals includes tracking respective phases of the uplink signals received by the antennas, and combining the respective phases from the plurality of the antennas so as to recover at least one of carrier frequency offset and an instantaneous carrier phase of the uplink signals.

Further additionally or alternatively, the access point includes at least first and second transceivers, which are coupled to respective antennas among the multiple antennas and have respective response characteristics, and the method includes making a measurement of the response characteristics of at least one of the first and second transceivers by transmitting a calibration signal from the first transceiver to the second transceiver via the respective antennas, and modifying the uplink signals received by the access point responsively to the measurement so as to compensate for an imperfection in the response characteristics. Typically, the imperfection includes a mismatch in the respective response characteristics of the first and second transceivers.

Still further additionally or alternatively, the access point includes multiple direct-conversion transceivers, which are respectively coupled to the antennas and include respective local oscillators, and which generate respective baseband signals responsively to the uplink signals, the baseband signals having respective phases that are determined by the respective local oscillators, and the method includes providing a reference signal to the transceivers so as to synchronize the phases of the baseband signals provided by the multiple transceivers.

There is also provided, in accordance with an embodiment of the present invention, a method for communication over a wireless local area network (WLAN), including:

receiving first signals from a plurality of stations in the WLAN;

responsively to the first signals, determining respective spatial signatures of the stations;

calculating beamforming weights based on the spatial signatures; and communicating with two or more of the stations simultaneously by spatial division multiplexing (SDM) using the beamforming weights.

In some embodiments, receiving the first signals includes prompting the stations to transmit respective uplink signals such that the stations transmit the uplink signals in a predetermined sequence. Typically, prompting the stations includes causing each of the stations to transmit the uplink signals within a respective, predetermined time window. In one embodiment, prompting the stations includes causing the stations to transmit the uplink signals at intervals selected so that at least some of the uplink signals overlap in time. In some of these embodiments, receiving the first signals includes sending a broadcast message so as to disable uplink transmission by the stations in the WLAN for a predetermined period, and prompting the stations includes sending a second message, following the broadcast message, to each of the stations in the predetermined sequence.

Typically, receiving the first signals includes receiving the first signals at multiple antennas of an access point in the WLAN, and determining the respective spatial signatures includes computing a signature vector responsively to the first signals received by each of the antennas. In a disclosed embodiment, computing the signature vector includes, for each station among the plurality of stations, finding a correlation between a sequence of samples of the signals received by each of the antennas and a known preamble of a packet carried by the first signals. Typically, the method also includes combining the respective correlations from the plurality of the antennas so as to recover a timing of the first signals.

Additionally or alternatively, the method may include tracking respective phases of the first signals received by the antennas, and combining the respective phases from the plurality of the antennas so as to recover a carrier frequency offset of the first signals.

In some embodiments, the access point includes at least first and second transceivers, which are coupled to respective antennas among the multiple antennas and have respective response characteristics, and the method includes making a measurement of the response characteristics of at least one of the first and second transceivers by transmitting a calibration signal from first transceiver to the second transceiver via the respective antennas, and modifying uplink signals received by the access point responsively to the measurement so as to compensate for an imperfection in the response characteristics. The imperfection may include a mismatch in the respective response characteristics of the first and second transceivers.

In a disclosed embodiment, calculating the beamforming weights includes orthogonalizing the spatial signatures of two or more of the stations.

In some embodiments, communicating with the two or more of the stations includes exchanging second signals with the stations, and calculating the beamforming weights includes determining the beamforming weights so that application of the beamforming weights to the second signals causes a distortion of the second signals to be reduced. Additionally or alternatively, application of the beamforming weights to the second signals causes an interference between the second signals to be reduced. In a disclosed embodiment, determining the beamforming weights includes minimizing a cost function having a first term corresponding to the distortion and at least a second term corresponding to the interference, wherein different, respective weight factors are assigned to the first and second terms in the cost function.

Further additionally or alternatively, receiving at least one interfering signal from a source other than the plurality of the stations, and calculating the beamforming weights includes determining the beamforming weights so that application of the beamforming weights to the second signals causes an interference due to the at least one interfering signal to be reduced.

In some embodiments, communicating with the two or more of the stations includes transmitting downlink signals to the stations and receiving uplink signals from the stations, and calculating the beamforming weights includes calculating first beamforming weights for application to the uplink signals and second beamforming weights for application to the downlink signals, wherein the second beamforming weights are different from the first beamforming weights. Typically, calculating the second beamforming weights includes computing respective transmit beamforming weights for application to the downlink signals that are to be transmitted to each of the two or more of the stations, and optimizing the transmit beamforming weights jointly for all of the two or more of the stations so as to reduce an interference between the downlink signals received by each of the two or more of the stations.

There is additionally provided, in accordance with an embodiment of the present invention, a method for communication over a wireless local area network (WLAN), including:

selecting a set of stations in the WLAN for inclusion in a spatial multiplexing group;

during a first operating period, permitting the stations in the WLAN to transmit uplink signals subject to a collision-avoidance mechanism provided by a standard applicable to the WLAN;

transmitting a broadcast message from an access point to the stations in the WLAN so as to disable transmission of the uplink signals, thereby terminating the first operating period; and during a second operating period immediately following the broadcast message, transmitting downlink signals from the access point simultaneously to the stations in the spatial multiplexing group using spatial division multiplexing (SDM).

In some embodiments, the standard applicable to the WLAN includes an IEEE 802.11 standard, and transmitting the broadcast message includes transmitting a Clear-to-Send (CTS) message. In a disclosed embodiment, transmitting the broadcast message includes transmitting a delivery traffic indication message (DTIM) prior to the CTS message.

Typically, transmitting the downlink signals during the second operating period includes transmitting the downlink signals without using the collision-avoidance mechanism.

In disclosed embodiments, transmitting the broadcast message includes specifying, in the broadcast message, a duration of the second operating period. Typically, upon a conclusion of the specified duration, the stations in the WLAN are permitted to resume transmission of the uplink signals. Additionally or alternatively, transmitting the broadcast message includes repeating transmission of the broadcast message periodically, at predetermined intervals, so as to define successive downlink and uplink transmission periods within the WLAN.

There is further provided, in accordance with an embodiment of the present invention, a method for communication over a wireless local area network (WLAN), including:

receiving uplink signals at an access point from at least one station in the WLAN via multiple antennas that are coupled to the access point;

finding respective correlations between respective sequences of samples of the uplink signals received by the antennas and a known preamble of a packet carried by the uplink signals;

tracking respective phases of the uplink signals received by the antennas;

combining the respective correlations from the plurality of the antennas so as to recover a timing of the uplink signals; and combining the respective phases from the plurality of the antennas so as to recover a carrier frequency offset and a carrier phase of the uplink signals.

In disclosed embodiments, receiving the uplink signals includes receiving the uplink signals from a plurality of stations in the WLAN, and communicating with two or more of the stations simultaneously by spatial division multiplexing (SDM), responsively to the recovered timing and carrier phase. In one embodiment, combining the respective correlations includes computing a sum of the respective correlations so as to find the timing that maximizes the sum.

In some embodiments, combining the respective correlations includes finding the timing that maximizes a plurality of the respective correlations.

Additionally or alternatively, combining the respective phases includes summing the respective phases. In one embodiment, summing the respective phases includes measuring respective powers of the uplink signals, weighting the respective phases responsively to the respective powers, and summing the weighted respective phases.

There is moreover provided, in accordance with an embodiment of the present invention, a method for communication over a wireless local area network (WLAN), including:

selecting a number of stations in the WLAN for inclusion in a spatial multiplexing group;

determining a downlink transmission rate for the spatial multiplexing group responsively to the number of the stations in the group; and transmitting downlink signals simultaneously to the stations in the spatial multiplexing group using spatial division multiplexing (SDM) at the downlink transmission rate.

In disclosed embodiments, determining the downlink transmission rate includes measuring a level of uplink signals received from the stations in the spatial multiplexing group, and selecting the downlink transmission rate from a table using an index determined by the level of the uplink signals. Typically, the table includes different lists of entries corresponding to different numbers of the stations that may be included in the spatial multiplexing group. In one embodiment, selecting the downlink transmission rate includes collecting statistics that are indicative of errors in communication between an access point and the stations in the spatial multiplexing group, and adjusting the index responsively to the statistics.

There is furthermore provided, in accordance with an embodiment of the present invention, a method for communication over a wireless local area network (WLAN), including:

providing an access point including a plurality of transceivers coupled to respective antennas for communication over the WLAN, the plurality of transceivers including at least first and second transceivers, each transceiver including a respective transmitter and a respective receiver having respective response characteristics;

configuring the access point to exchange communication signals with a station in the WLAN by communicating simultaneously with the station through the first and second transceivers;

making a measurement of the response characteristics of at least one of the first and second transceivers by transmitting a calibration signal through the transmitter of the first transceiver and receiving the transmitted calibration signal through the receiver of the second transceiver; and applying calibration factors to the communication signals responsively to the measurement so as to compensate for one or more imperfections in the response characteristics.

In a disclosed embodiment, the plurality of transceivers includes at least a third transceiver, and the one or more imperfections include a mismatch in the response characteristics of the at least one of the first and second transceivers relative to the third transceiver, and making the measurement includes at least one of at least one of transmitting the calibration signal and receiving the transmitted calibration signal through the third transceiver.

Additionally or alternatively, the imperfection includes an I/Q mismatch of at least one of the transmitter and the receiver of at least one of the transceivers. In disclosed embodiments, transmitting the calibration signal includes transmitting a sequence of signal vectors having respective phases and amplitudes, and making the measurement includes determining the I/Q mismatch of at least the transmitter by measuring a power of the calibration signal that is received responsively to the signal vectors in the sequence. Typically, making the measurement further includes measuring a local oscillator leakage of the transmitter based on the calibration signal that is received responsively to the signal vectors in the sequence.

Additionally or alternatively, determining the I/Q mismatch includes measuring the I/Q mismatch of the transmitter by receiving the transmitted calibration signal through the receiver of the second transceiver prior to having determined the I/Q mismatch of the receiver.

Further additionally or alternatively, making the measurement includes at least one of transmitting the calibration signal through two or more of the plurality of the transceivers, and receiving the calibration signal through two or more of the plurality of the transceivers, so as to make at least one further measurement of the response characteristics of one or more of the transceivers, and applying the calibration factors includes using the at least one further measurement in determining the calibration factors. Typically, performing the at least one further measurement includes transmitting the calibration signal through the transmitter of the second transceiver and receiving the transmitted calibration signal through the receiver of the first transceiver.

In a disclosed embodiment, communicating simultaneously with the station through the first and second transceivers includes applying beamforming coefficients to the signals conveyed through the first and second transceivers.

In some embodiments, making the measurement includes measuring the response characteristics as a function of frequency, and applying the calibration factors includes filtering the communication signals using the calibration factors. Additionally or alternatively, making the measurement includes varying a gain of the at least one of the first and second transceivers, and measuring the response characteristics as a function of the gain, and applying the calibration factors includes selecting the calibration factors to apply responsively to a gain setting of the at least one of the first and second transceivers.

There is also provided, in accordance with an embodiment of the present invention, a method for communication over a wireless local area network (WLAN), including:

providing an access point including a plurality of transceivers coupled to respective antennas for communication over the WLAN, each transceiver including:

a respective receiver, which is coupled to receive uplink radio frequency (RF) signals from a station in the WLAN;

a down-converter, which is adapted to down-convert the RF signals to baseband signals having a phase; and a local oscillator, which is coupled to drive the down-converter, thereby determining the phase of the baseband signals;

configuring the access point to exchange communication signals with a station in the WLAN by communicating simultaneously with the station through the plurality of the transceivers; and applying a reference signal to the transceivers so as to synchronize the phase of the baseband signals provided by the plurality of transceivers to a digital processing circuit in the access point.

In some embodiments, the local oscillator of each of the transceivers includes a phase-locked loop, and applying the reference signal includes coupling a respective loop filter to the phase-locked loop in each of the transceivers so as to enhance a coherency of the local oscillators among the transceivers.

In further embodiments, applying the reference signal includes:

injecting the reference signal into the RF signals;

measuring a phase deviation among the baseband signals by detecting a component of the baseband signals corresponding to the injected reference signal; and adjusting the phase of the baseband signals to compensate for the phase deviation.

There is additionally provided, in accordance with an embodiment of the present invention, an access point for communication over a wireless local area network (WLAN), including:

a plurality of transceivers, which are coupled to receive uplink signals via respective antennas from stations in the WLAN;

control circuitry, which is adapted, responsively to the uplink signals, to select a set of the stations for inclusion in a spatial multiplexing group; and spatial division multiplexing (SDM) circuitry, which is coupled to the transceivers so as to transmit downlink signals simultaneously to the set of the stations in the spatial multiplexing group.

There is further provided, in accordance with an embodiment of the present invention, an access point for communication over a wireless local area network (WLAN), including:

a plurality of transceivers, which are coupled to receive first signals via respective antennas from stations in the WLAN;

control circuitry, which is adapted, responsively to the first signals, to determine respective spatial signatures of the stations and to calculate beamforming weights based on the spatial signatures; and spatial division multiplexing (SDM) circuitry, which is coupled to the transceivers so as to communicate with two or more of the stations simultaneously by spatial division multiplexing (SDM) using the beamforming weights.

There is moreover provided, in accordance with an embodiment of the present invention, an access point for communication over a wireless local area network (WLAN), including:

a plurality of transceivers, which are coupled via respective antennas to communicate with stations in the WLAN;

spatial division multiplexing (SDM) circuitry, which is coupled to the transceivers so as to communicate with a set of the stations simultaneously by spatial division multiplexing (SDM); and control circuitry, which is configured to permit the stations in the WLAN to transmit uplink signals during a first operating period, subject to a collision-avoidance mechanism provided by a standard applicable to the WLAN, and to transmit a broadcast message to the stations so as to disable transmission of the uplink signals, thereby terminating the first operating period, and to cause the SDM circuitry to transmit downlink signals simultaneously to the stations in the set during a second operating period immediately following the broadcast message.

There is furthermore provided, in accordance with an embodiment of the present invention, an access point for communication over a wireless local area network (WLAN), including:

a plurality of transceivers, which are coupled via respective antennas to receive uplink signals from at least one station in the WLAN; and control circuitry, which is adapted to find respective correlations between respective sequences of samples of the uplink signals received by the antennas and a known preamble of a packet carried by the uplink signals, and to track respective phases of the uplink signals received by the antennas, and to combine the respective correlations from the plurality of the antennas so as to recover a timing of the uplink signals, and to combine the respective phases from the plurality of the antennas so as to recover a carrier phase of the uplink signals.

There is also provided, in accordance with an embodiment of the present invention, an access point for communication over a wireless local area network (WLAN), including:

a plurality of transceivers, which are coupled via respective antennas to communicate with stations in the WLAN;

spatial division multiplexing (SDM) circuitry, which is coupled to the transceivers so as to communicate with a number of the stations in a spatial multiplexing group simultaneously by spatial division multiplexing (SDM); and control circuitry, which is adapted to determine a downlink transmission rate for the spatial multiplexing group responsively to the number of the stations in the group, and to cause the SDM circuitry to transmit downlink signals simultaneously to the stations in the spatial multiplexing group using SDM at the downlink transmission rate.

There is additionally provided, in accordance with an embodiment of the present invention, an access point for use in a wireless local area network (WLAN), including:

a plurality of antennas;

a plurality of transceivers, the plurality including at least first and second transceivers, each transceiver including a respective transmitter and a respective receiver, which are coupled to a respective one of the antennas and have respective response characteristics;

a digital processing circuit, which is coupled to exchange communication signals with a station in the WLAN by communicating simultaneously through the first and second transceivers; and a calibration circuit, which is coupled to make a measurement of the response characteristics of at least one of the first and second transceivers by transmitting a calibration signal through the transmitter of the first transceiver and receiving the transmitted calibration signal through the receiver of the second transceiver, and which is adapted to determine calibration factors for application to the communication signals responsively to the measurement so as to compensate for one or more imperfections in the response characteristics.

There is further provided, in accordance with an embodiment of the present invention, an access point for use in a wireless local area network (WLAN), including:

a plurality of antennas;

a plurality of transceivers, each including:

a respective receiver, which is coupled to receive uplink radio frequency (RF) signals from a station in the WLAN via a respective one of the antennas;

a down-converter, which is adapted to down-convert the RF signals to baseband signals having a phase; and a local oscillator, which is coupled to drive the down-converter, thereby determining the phase of the baseband signals;

a digital processing circuit, which is coupled to receive and process the baseband signals simultaneously from the plurality of the transceivers; and a transceiver controller, which is coupled to provide a reference signal to the transceivers so as to synchronize the phase of the baseband signals provided by the plurality of transceivers to the digital processing circuit.

The present invention will be more fully understood from the following detailed description of the embodiments thereof, taken together with the drawings in which:

BRIEF DESCRIPTION OF THE DRAWINGS

FIGS. 8A and 8B are vector diagrams that schematically illustrate signals used in calibrating an array of transceivers, in accordance with another embodiment of the present invention;

FIGS. 10A and 10B are timing diagrams that schematically illustrate signals transmitted between an access point and stations in a SMG, in accordance with an embodiment of the present invention;

FIG. 11 is a flow chart that schematically illustrates a method for determining beamforming weights, in accordance with an embodiment of the present invention;

FIG. 12 is a block diagram that schematically illustrates functional elements of a space-time scheduler (STS), in accordance with an embodiment of the present invention;

DETAILED DESCRIPTION OF EMBODIMENTS

System Characteristics

Figure 1:
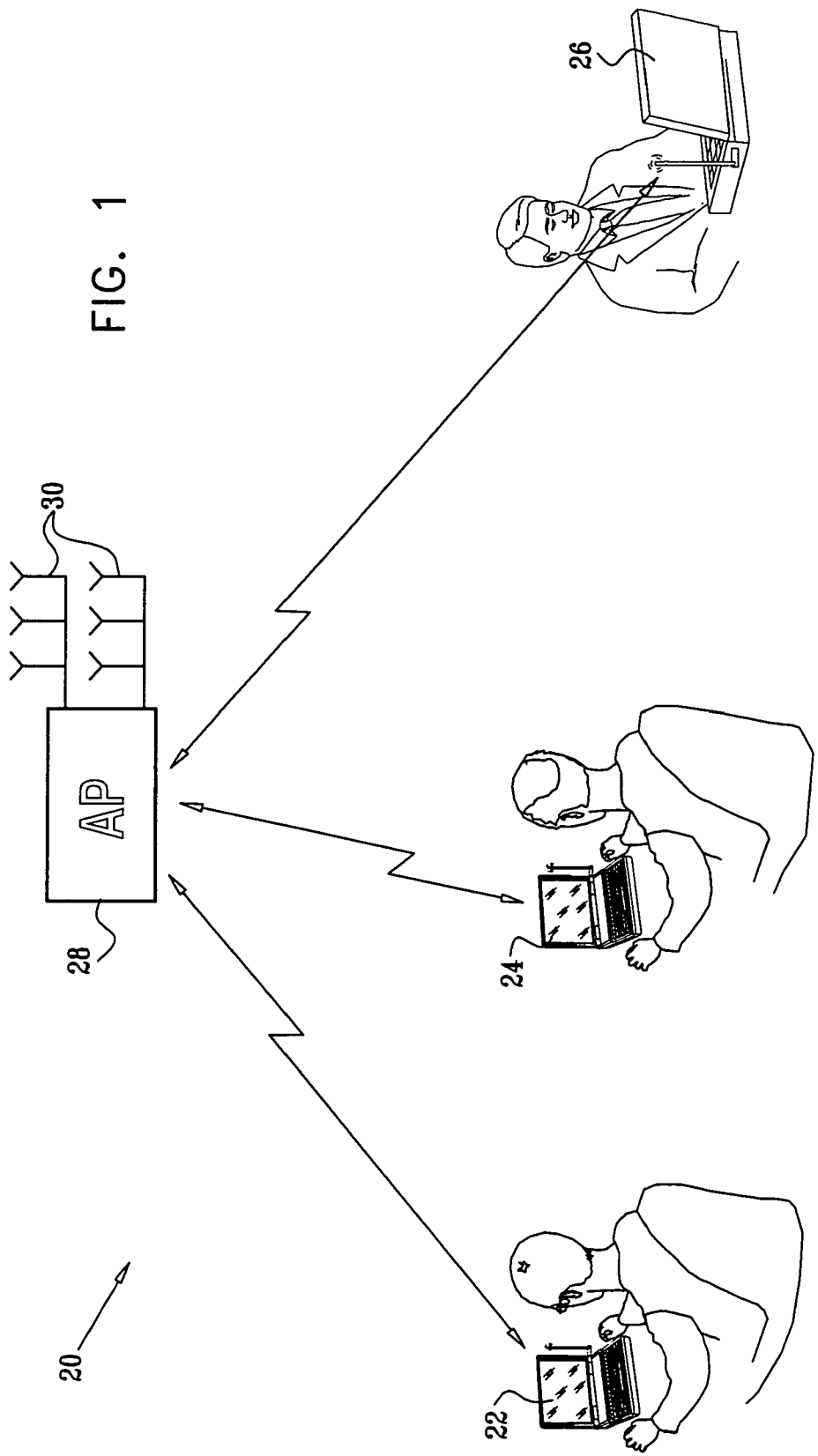
FIG. 1 is a schematic, pictorial illustration of a WLAN with spatial division multiplexing (SDM), in accordance with an embodiment of the present invention.

FIG. 1 is a block diagram that schematically illustrates a wireless LAN (WLAN) 20, in accordance with an embodiment of the present invention. System 20 comprises an access point 28, which communicates with stations 22, 24, 26, on a given frequency channel. The mobile stations typically comprise computing devices, such as desktop, portable or handheld devices. Although for the sake of simplicity, only three stations are shown in the figure, in practice access point 28 may handle a larger number of mobile stations simultaneously.

Access point 28 comprises an array of antennas 30, which permit the access point to perform spatial division multiplexing (SDM) among the stations, as described hereinbelow. In general, access point 28 has a number p of antennas 30, and is configured to handle spatial multiplexing groups (SMGs) of up to m stations in a group, wherein $m \leq p$. For example, in one typical embodiment, p=6 and m=4, though greater or smaller numbers of antennas and stations may be handled in a similar fashion. Although for the sake of simplicity, only a single access point is shown in FIG. 1, WLAN 20 typically comprises multiple access points, and the present invention may be implemented in some or all of these access points.

In the exemplary embodiments described hereinbelow, it is assumed that the access points and mobile stations communicate with one another in accordance with one of the standards in the IEEE 802.11 family and observe the applicable 802.11 physical (PHY) layer and medium access control (MAC) layer conventions. Details of the 802.11 PHY and MAC layers are described in ANSI/IEEE Standard 802.11 (1999 Edition), and specifically in Part 11: Wireless LAN Medium Access Control (MAC) and Physical Layer (PHY) Specifications, which is incorporated herein by reference. The principles of the present invention, however, are not limited to the 802.11 standards, and may likewise be applied to other types of WLANs, as well as to other packet-based wireless communication systems.

Figure 2:
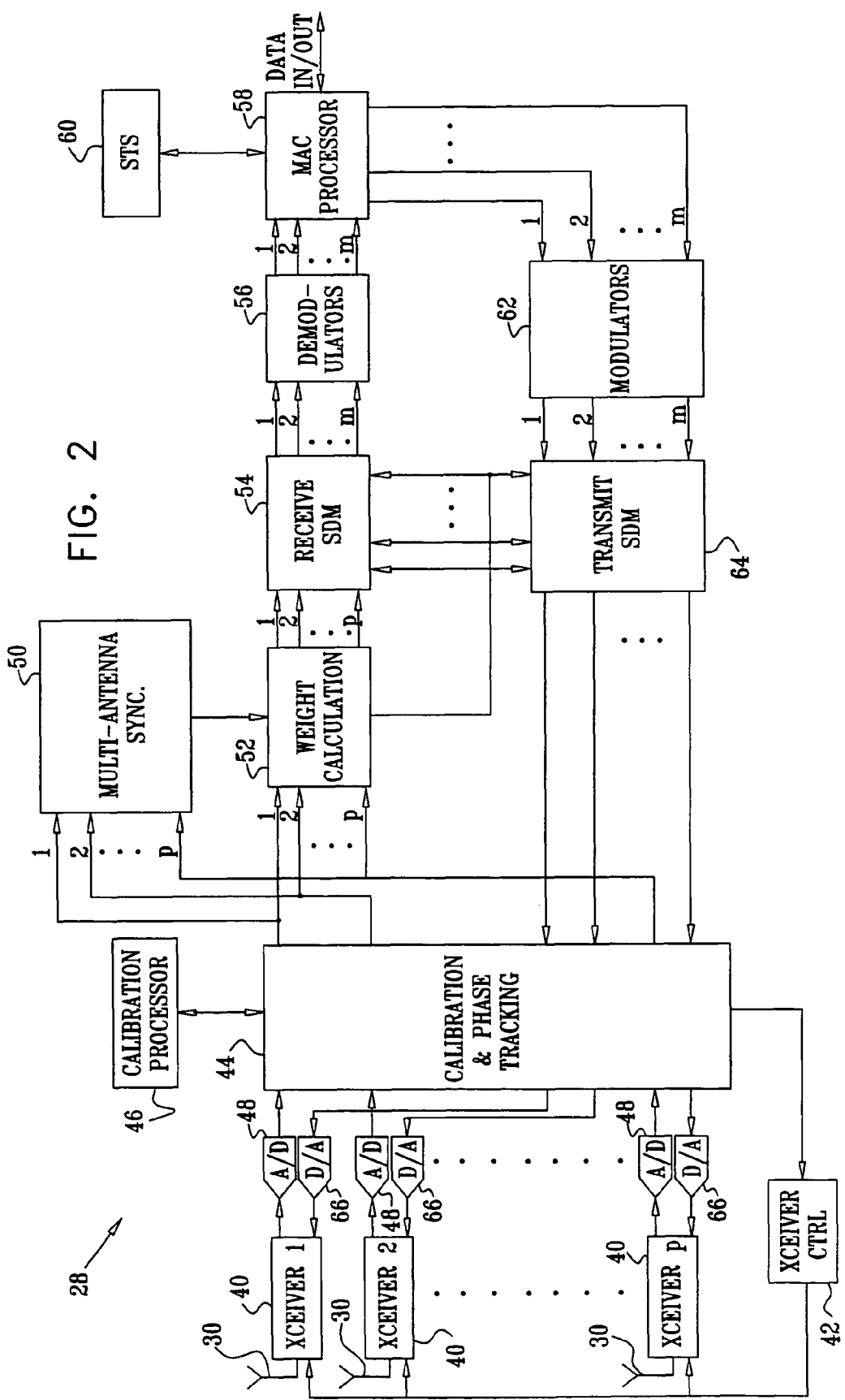
FIG. 2 is a block diagram that schematically shows elements of a WLAN access point, in accordance with an embodiment of the present invention.

FIG. 2 is a block diagram showing details of access point 28, in accordance with an embodiment of the present invention. Typically, the functional elements shown in this figure are implemented in one or more custom or semi-custom integrated circuits. Alternatively or additionally, some or all of these elements may be implemented in software on a suitable microprocessor or digital signal processor (DSP) device, or may be implemented in hard-wired logic using discrete circuit components. The elements of access point 28 that are shown in FIG. 2 are divided into certain functional blocks for the sake of conceptual clarity. It will be apparent to those skilled in the art, however, that in practice the operations of these blocks may be grouped together or separated into sub-blocks, depending on implementation considerations. All such alternative implementations are considered to be within the scope of the present invention. For convenience, different functional elements of access point 28 that perform computation and control functions may be referred to hereinbelow collectively as "control circuitry."

Access point 28 comprises p radio transceivers 40, one coupled to each of antennas 30. Typically, the transceivers are inexpensive, integrated, direct-conversion transceivers, each containing its own local oscillator frequency source for up- and down-conversion of signals between baseband and radio frequency (RF). (A direct-conversion transceiver converts baseband signals to RF and vice versa without an intervening intermediate frequency (IF) stage.) The use of such transceivers leads to problems of synchronization and non-uniform response between the different antenna channels. These problems are solved in a novel way through the use of a transceiver control unit 42 and a calibration and phase tracking circuit 44. A calibration processor 46 determines the required corrections to be applied to the radio signals, and instructs circuit 44 to implement these corrections, as described in detail hereinbelow. Alternatively, access point 28 may comprise high-quality, pre-calibrated, coherent transceivers, in which case at least some of the functions of control unit 42 and circuit 44 may be obviated.

The functions of calibration and phase tracking circuit 44 may be carried out in either the digital or the analog domain. In the embodiment shown in FIG. 2, circuit 44 operates in the digital domain. Transceivers down-convert uplink signals to baseband, and the baseband signals are digitized by corresponding analog/digital converters 48. After phase and response compensation by circuit 44, the digital samples are input to a multi-antenna synchronization and carrier acquisition circuit 50. This circuit operates on the preamble sequences of the uplink data packets in order to perform timing and carrier recovery functions, as described in greater detail hereinbelow.

Based on the corrected input signals from circuit 44 and the timing provided by circuit 50, a weight calculation circuit 52 determines beamforming weights for each of the m stations in the current SMG. In other words, circuit 52 computes complex beamforming coefficients for application to each of the p streams of input samples, in either the time or frequency domain. A receive SDM circuit 54 multiplies each vector of time- or frequency-domain samples received from circuit 44 by the appropriate beamforming coefficients, and then sums the results in order to separate out the m individual uplink signals transmitted by the stations in the current SMG. These uplink signals are input to demodulators 56, which convert the digital sample streams into data packets.

The next step in packet processing by access point is medium access control (MAC) protocol processing, which is carried out by a MAC processor 58, as dictated by the 802.11 standard. MAC-level processing is for the most part beyond the scope of the present patent application, with the exception of certain specific features described hereinbelow. A space-time scheduler (STS) 60 interacts with MAC processor 58 in order to arrange stations into SMGs and control transmission of downlink signals accordingly. This function is also described in detail hereinbelow.

Downlink packets generated by MAC processor 58 are passed to modulators 62 for conversion to digital output samples. The modulators (and likewise demodulators 56) are typically capable of handling packets for different stations in WLAN 20 at different transmission rates, within the same SMG. Furthermore, if access point 28 supports 802.11g, multi-carrier signals may be transmitted and received in the same SMG as single-carrier 802.11b-type signals.

Modulators 62 generate m modulated sample streams. A transmit SDM circuit 64 applies the beamforming coefficients generated by weight calculation circuit 52 to the m streams in order to generate p downlink sample streams for transmission via the p antennas 30. The beamforming matrix applied by transmit SDM circuit 64 may simply be the same as that applied by receive SDM circuit 54. Alternatively, the transmit weights may be modified for interference mitigation, as described hereinbelow. The p streams of downlink samples are typically modified by circuit 44 in order to pre-compensate for phase variations and response non-uniformities of transceivers 40. The modified samples are converted to analog signals by digital-to-analog converters (D/A) 66, and are then transmitted as RF downlink signals by transceivers 40.

A number of the key elements and functions of access point 28 will now be described in detail.

Pseudo-Coherent Operation of Transceivers

Figure 3:
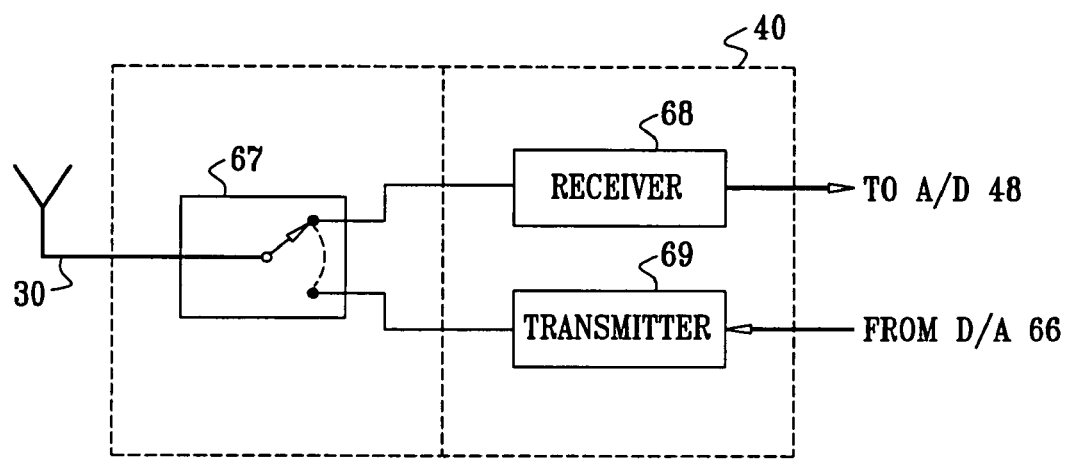
FIG. 3 is a block diagram that schematically shows details of a transceiver circuit used in an access point.

FIG. 3 is a block diagram that schematically shows elements of one of transceivers 40 in access point 28. As noted earlier, in some embodiments of the present invention, transceivers 40 comprise low-price, off-shelf, direct-conversion devices. Several manufacturers offer fully-integrated transceivers of this sort, which are specifically designed for the 802.11 specifications and require very few external electronic components. Examples of this sort of transceiver include the MAX2825, MAX2826 and MAX2827 devices made by Maxim Integrated Products (Sunnyvale, Calif.), as well as the SA2451 and SA5251 devices made by Philips Semiconductors (Eindhoven, Netherlands) and the RF2988 device made by RF Micro Devices (Greensboro, N.C.). As shown in the figure, the transceiver comprises an integrated receiver 68 and transmitter 69, which are coupled to antenna 30 via a switch 67, as is known in the art. Switch 67 may be an integral part of the transceiver, or it may alternatively be added externally, along with other ancillary components.

Two problems, in particular, arise when multiple transceivers of this sort are used together in a SDM scheme (as well as in other multi-antenna applications, such as beamforming, direction-finding and MIMO solutions):

Because of the direct-conversion architecture of these devices, the transceivers suffer from low image-rejection ratio due to I/Q imbalances. This problem is addressed by a calibration procedure that is described hereinbelow with reference to FIG. 6.

Simple, low-cost transceivers generally include an internal voltage controlled oscillator (VCO), which drive an integrated mixer for the purpose of up- and down-converting the RF signals. Each individual transceiver has its own VCO and each VCO is individually locked to a reference frequency source, with its own phase-locked-loop (PLL). As a result, phase deviations between the transceivers may compromise the beam-forming quality of access point 28. The embodiments shown in FIGS. 4A and 4B address this issue.

In contrast to access point 28, SDM systems known in the art avoid this latter problem by using a coherent set of transceivers. A coherent system typically includes one common local oscillator (LO), split into p identical replicas to drive the mixers in all the transceivers (or 2p replicas, in the case of direct-conversion I/Q mixers).

Figure 4A:
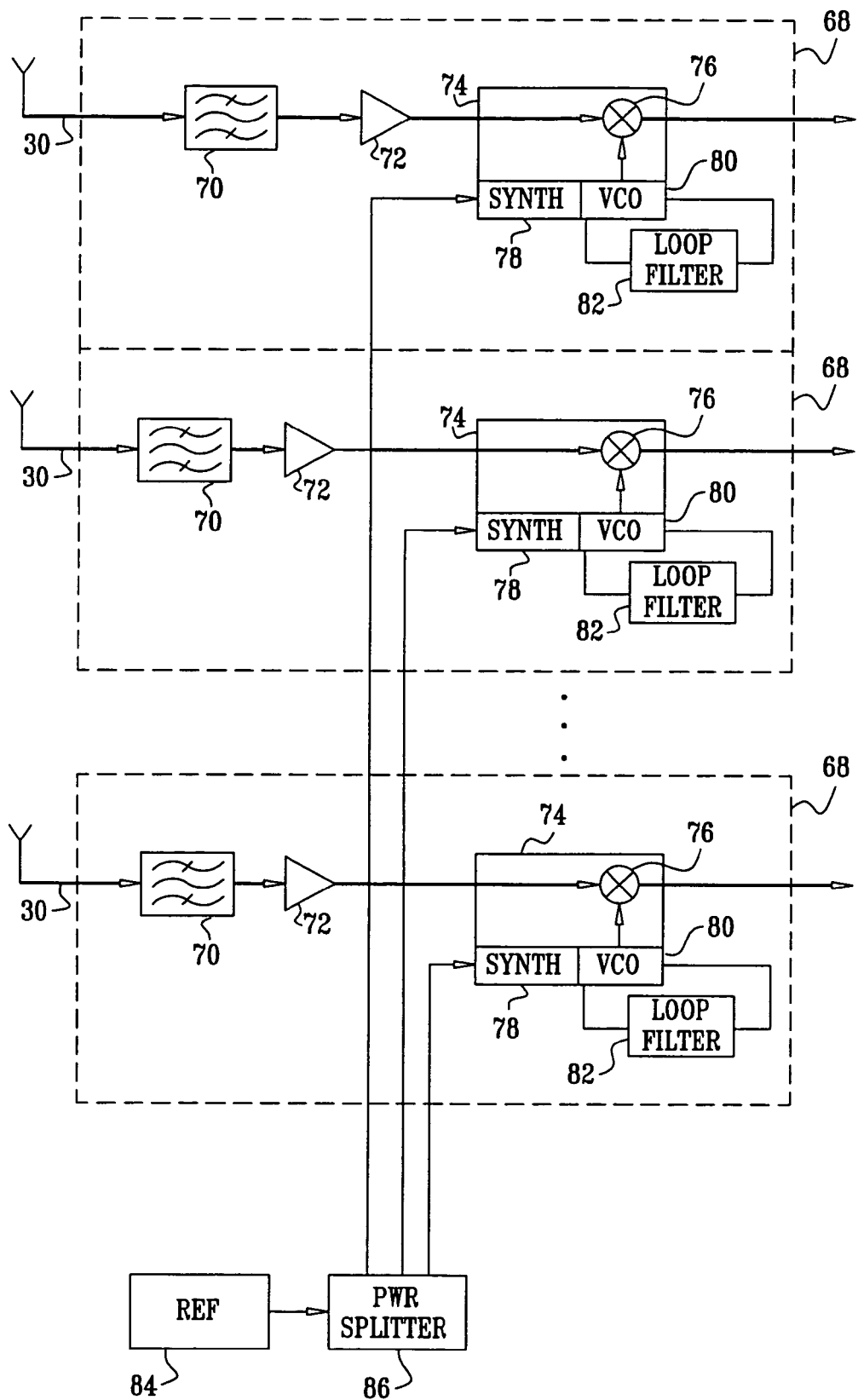
FIGS. 4A and 4B are block diagrams that schematically illustrate receiver circuits used in a pseudo-coherent multi-transceiver access point, in accordance with embodiments of the present invention.

FIG. 4A is a block diagram that schematically shows elements of receivers 68 in access point 28, in accordance with an embodiment of the present invention. Transmitters 69 are omitted for the sake of simplicity. Each receiver comprises a bandpass filter 70, which passes the RF frequency band of interest. A low noise amplifier 72 amplifies the RF signals, and a down-conversion circuit 74 converts the RF signals down to baseband. Circuit 74 comprises a mixer 76, which is driven by a local VCO 80 under control of a synthesizer 78. In practice, direct-conversion transceivers comprise separate in-phase (I) and quadrature (Q) mixers, but for the sake of simplicity, only a single mixer is shown in each receiver in this figure.

Transceiver control unit 42 comprises a reference oscillator 84, for generating a reference frequency, and a power splitter 86, which distributes the reference frequency to all the transceivers. Each synthesizer 78 uses a phase-locked loop (PLL) with a loop filter 82 to track the source frequency of the reference oscillator. Typically, the loop filter is connected externally to the integrated transceiver and may be implemented, for example, as an analog filter, such as a second-order filter, using discrete components. Since each of the transceivers has its own VCO 80, however, the transceivers cannot be fully coherent, due to the phase-noise of the individual VCOs. Synthesizers 78 track low-frequency phase changes occurring at reference oscillator 84, roughly up to the frequency limit of the loop filter bandwidth. Phase variations occurring at higher frequencies cannot be tracked in this manner. Therefore, at these higher frequencies, the non-coherent VCO phase noise dominates.

In an embodiment of the present invention, the response of loop filter 82 is designed so as to minimize the effect of this high-frequency, non-coherent phase noise. The non-coherent phase noise (NCPN) is determined by the phase-noise spectral density function $S(f_c+f)$ of the VCO, wherein $f_c$ is the nominal center frequency of the VCO, and by the baseband representation of the frequency-domain closed loop response, $H(f)$, of the PLL:

$$NCPN = \int_{-\infty}^{\infty} S(f_c + f)H(f)\,df \quad (1)$$

Since in practice the phase-noise spectral density function is symmetrical, the above expression can also be written as:

$$NCPN = 2 \cdot \int_{0}^{\infty} S(f_c + f)H(f)\,df \quad (2)$$

Based on this formulation, the loop filter is designed to achieve the desired level of integrated non-coherent phase-noise using a simple trial and error procedure, so as to minimize specifically the phase noise originating from VCO 80. By contrast, in conventional designs, the loop filter bandwidth is chosen so as to minimize the total phase-noise, which typically results in a different loop filter bandwidth from that given by equation (2).

In view of the above analysis, and given the fact that the phase noise power spectral density typically decreases monotonically with frequency, it can be concluded that widening the bandwidth of loop filter 82 is generally desirable in order to reduce the non-coherent phase noise among transceivers 40. In practice, however, the benefit gained by widening the loop filter bandwidth should generally be balanced against other factors that favor narrower bandwidth, for example:

Wider bandwidth means that more thermal noise passes the loop, adding to the total phase noise.

Increasing bandwidth too far may result in an unstable loop.

The phase noise of reference oscillator 84 may be greater than that of VCOs 80. In this case, reducing the loop filter bandwidth may be desirable to achieve lower total phase noise, at the cost of compromising coherence of the transceivers.

Although FIG. 4A relates explicitly only to receivers 68, VCOs 80 also serve as the frequency source for up-conversion of downlink signals by transmitters 69. Thus, the use of reference oscillator 84 and loop filters in reducing phase noise in the receivers is equally applicable and effective on the transmit side.

Figure 4B:
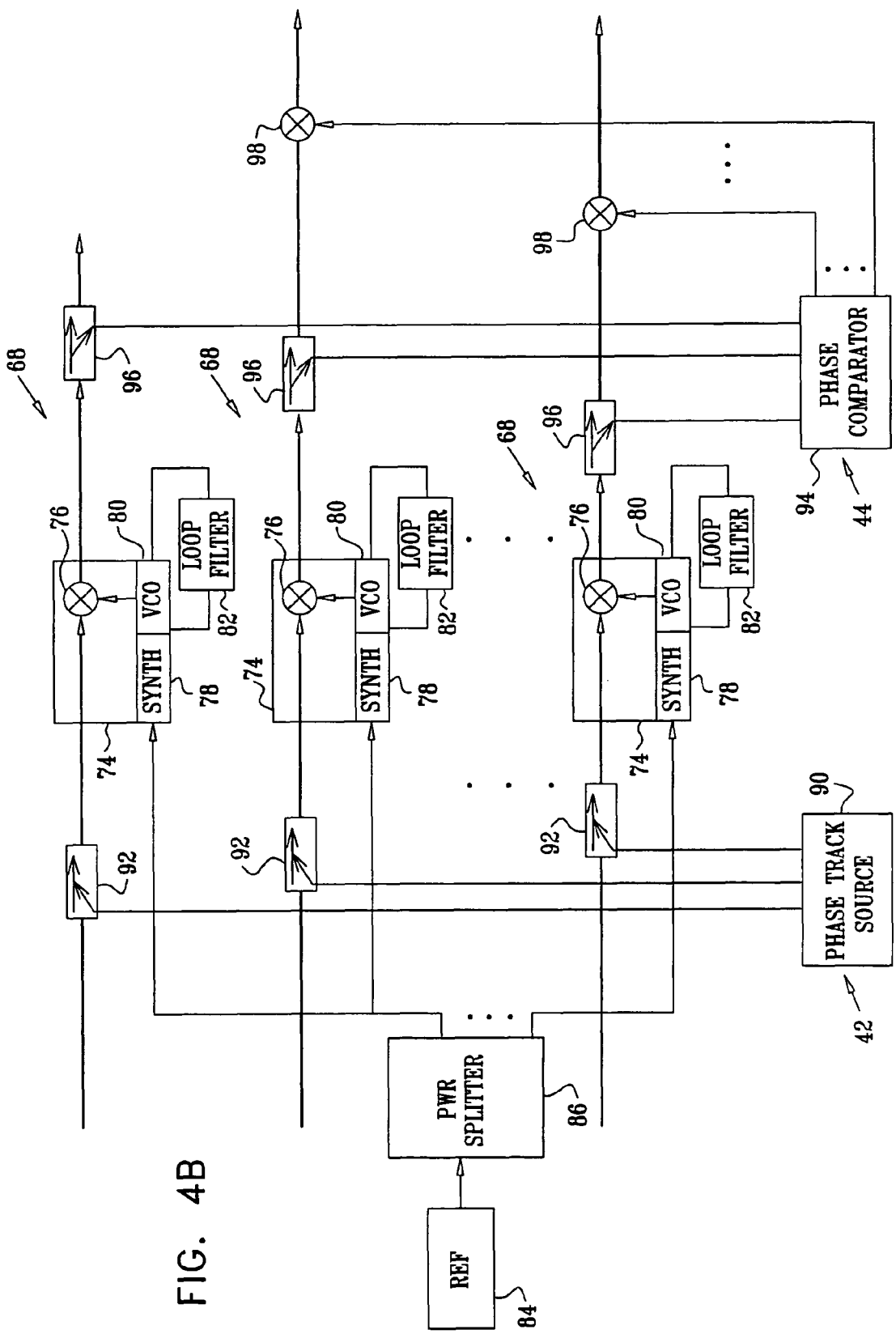

FIG. 4B is a block diagram that schematically shows elements of receivers 68 in access point 28, in accordance with another embodiment of the present invention. The transmitter circuits are again omitted for simplicity. Some of the elements shown in this figure are the same as those shown in FIG. 4A (while some other elements are omitted here to further simplify the illustration). The embodiments of FIGS. 4A and 4B may be used either separately or together in order to reduce the problem of phase noise in access point 28. Note that the phase tracking function of circuit 44 is typically performed continuously while access point 28 is either transmitting or receiving. On the other hand, the calibration functions of circuit 44, as described below, are performed only intermittently (although the calibration factors thus derived may be applied continuously thereafter). These different functions are unified in circuit 44 for the sake of simplicity of illustration, but in fact they represent separate and generally independent operations.

In the embodiment of FIG. 4B, transceiver control unit 42 comprises an inter-channel phase tracking source 90, which injects a synthesized test signal as a reference into all the receiver channels, via RF combiners 92, before the down-conversion stage. The center frequency of the test signal is typically chosen to be different from the carrier frequency $f_c$ of the received signals, and outside of the band of the signal of interest, so as to be easily filtered. Calibration and phase tracking circuit 44 comprises an inter-channel phase comparator 94, which samples the signals following down-conversion by each of the receivers, via splitters 96.

Comparator 94 filters the sampled signals to extract and detect the phase of the synthesized test signal in each channel following the down-conversion. By comparing the instantaneous phases of the different channels, comparator 94 is able to determine the phase mismatch between the channels. Typically, one of the channels (in this case the uppermost channel in the figure) is chosen as the reference channel. In order to correct for the phase mismatch relative to the reference channel, comparator 94 applies a respective phase rotation to a phase compensator 98 in each of the other channels. Finally, the test signal is filtered out of all the channels, leaving only the actual, received signals.

Although FIG. 4B shows an analog implementation, in another embodiment comparator 94 and compensators 98 comprise digital circuit elements. In this latter embodiment, the outputs of down-conversion circuits 74 are digitally sampled, and the phase-tracking test signal is then digitally filtered, typically using a finite impulse response (FIR) filter. Phase comparison is performed for each channel by complex multiplication of the conjugate of the samples from the channel with a sequence of reference samples, or simply by subtracting the phases of the signal and reference channels in a polar representation. Compensators 98 operate digitally in a similar fashion.

Inter-channel phase tracking can also be accomplished without injecting a synthesized signal. Instead, the phase comparison is performed on the actual uplink signals received by the different receivers 68 from one or more of stations 22, 24, 26, . . . . This approach is advantageous in terms of reducing hardware costs, but has the disadvantage that if the signal-to-noise ratio of the received signals is low, the inter-channel phase estimates are degraded. This potential problem is alleviated by using the synthesized test signal, generated by source 90, as a reference. If permitted by the design of transceivers 40 and the associated circuitry in access point 28, the receiver phase tracking described above may also be used to pre-correct for phase deviations in the signals transmitted by transmitters 69.

Calibration of Transceiver Response

Figure 5:
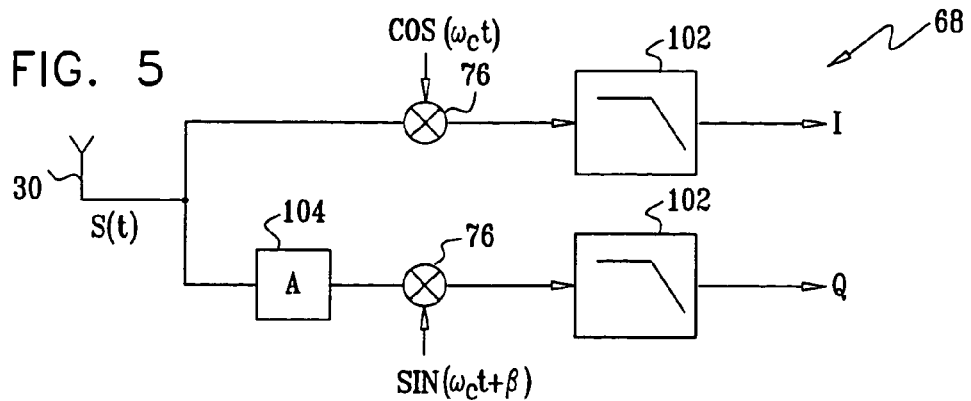
FIG. 5 is a block diagram that schematically shows elements of a wireless receiver.

FIG. 5 schematically illustrates a model of a part of receiver 68 in one of transceivers 40, which will be useful in understanding the methods of calibration described hereinbelow. Elements of the receiver that are not essential to understanding the calibration procedure, such as bandpass filter 70 and amplifier 72 (shown in FIG. 4A) are omitted here for simplicity. The receiver shown here comprises separate in-phase (I) and quadrature (Q) mixers 76, which are driven by the local oscillator with carrier frequency signals that are (ideally) offset in phase by 90°. The I and Q baseband signals that are generated in this manner are filtered by respective low-pass filters 102, and are then passed to A/D converters 48.

In order to achieve perfect image rejection in receiver 68, the I and Q paths must be perfectly matched both in phase and in amplitude. In practice, perfect matching cannot be achieved, especially when dealing with low-cost, mass-production transceivers of the type mentioned above, for which image rejection of about 20 to 30 dB is typical. It is convenient for some purposes to model the amplitude mismatch as a gain 104 in the Q channel, represented by a real scalar multiplier A. The multiplier typically deviates from unity by a few percent. The phase mismatch of the Q path relative to the I path is represented by a phase shift $\beta$, which is generally on the order of a few degrees. On the other hand, in actuality, A and $\beta$ vary with frequency over the bandwidth of transceivers 40. If the variation is substantial, the I/Q mismatch may be calibrated as a function of the frequency offset from the center frequency, leading to a vector of calibration factors as a function of frequency. In this case, the vector of calibration factors may be transformed to the time domain and applied to the signals by a digital filter, such as a finite impulse response (FIR) filter, in calibration and phase tracking circuit 44.

Furthermore, the I/Q mismatch may vary as a function of the transceiver gain settings. Therefore, it may be desirable to measure the I/Q mismatch and determine the calibration factors as a function of gain, as well. Then, when the gain of the transceivers changes, the appropriate calibration factors may be loaded from memory into circuit 44 in order to compensate for gain-related effects.

In addition, DC offsets appear at the I and Q outputs of the transceiver due to self-mixing of the local oscillator frequency. The DC offset may be exacerbated by imperfections of the A/D converters.

Transmitter 69 is similar to the receiver circuit shown in FIG. 5, except that the low-noise amplifier in the receiver is replaced by a power amplifier in the transmitter, and the signal flows in the opposite direction. Here, too, mismatches between the I and Q paths cause an undesired image of the transmitted signal to appear at the output, and the local oscillator may leak through to the output.

Figure 6:
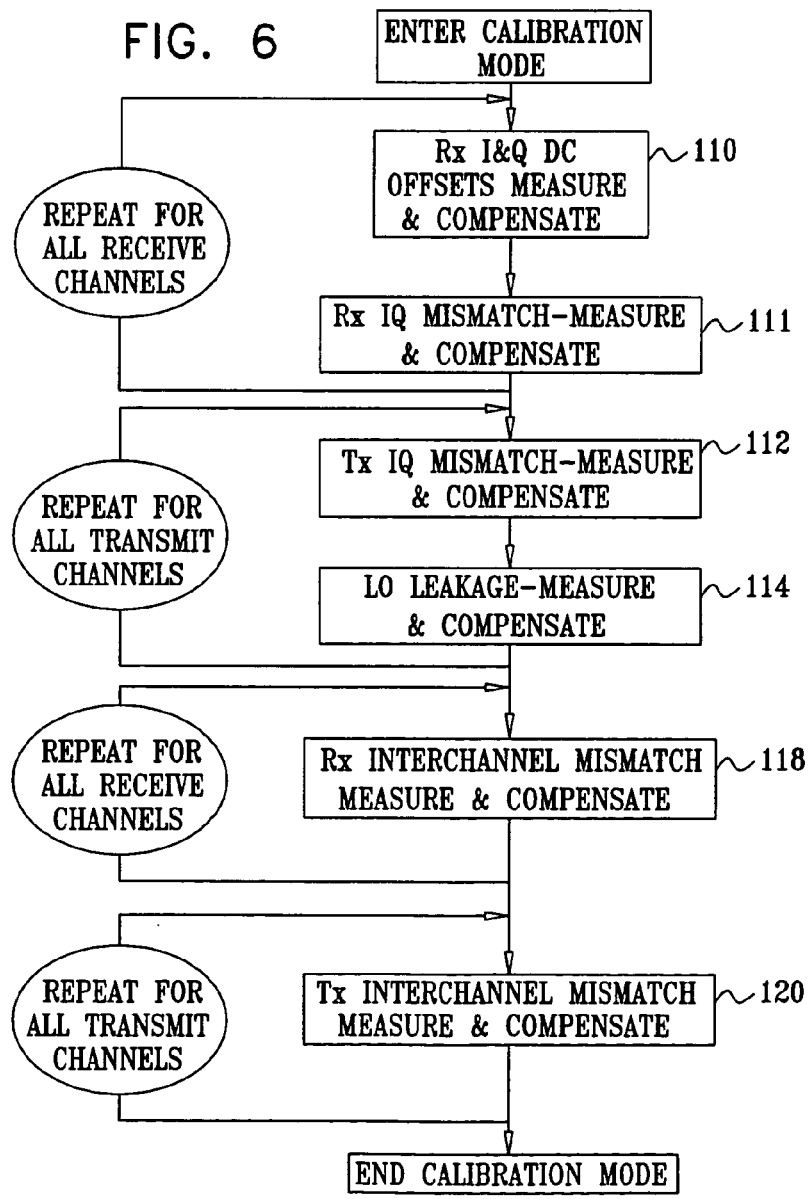
FIG. 6 is a flow chart that schematically illustrates a transceiver calibration procedure, in accordance with an embodiment of the present invention.

FIG. 6 is a flow chart that schematically illustrates a calibration procedure, which is performed by circuit 44 and calibration processor 46 in order to measure and compensate for the effects described above, in accordance with an embodiment of the present invention. Access point 28 typically runs this calibration procedure at system power-up, and may repeat the procedure periodically during operation. The frequency of repetition of the procedure depends on environmental conditions and performance requirements. This method uses the multiple transceivers 40 in access point 28 for self-calibration without the need for additional components or precise factory calibration. As a result, the calibration process may be repeated periodically in the field in order to maintain high performance over time, even under changing environmental conditions.

To begin the calibration procedure, access point 28 enters calibration mode, at an initiation step 108. As described below, the calibration process involves periodically using the wireless channel between antennas for calibration, by transmitting calibration signals from one of the antennas and receiving and measuring the signals at other antennas. Therefore, before starting the calibration procedure, the access point may take steps to ensure that there will be no interfering transmissions from stations 22, 24, 26, . . . , during the calibration period. Since the path loss between different antennas 30 in the same array is very low (typically about 20-30 dB), the access point must generally lower the transmitted power during the calibration procedure in order not to saturate its own receivers. Consequently, a remote station may not detect the calibration signals transmitted by the access point, and might therefore decide to transmit an uplink signal during the calibration process. In such a case, an interfering signal from the station will be mixed with the desired calibration signal, and the calibration procedure may fail as a result.

Therefore, at step 108, access point 28 transmits a message to all stations served by the access point, ordering the stations to remain silent during calibration. For this purpose, the access point may, for example, broadcast a CTS-to-Self message to stations 22, 24, 26, . . . , as defined by the 802.11 standard (section 9.2.11). The CTS-to-Self message specifies a period of time, and disables all stations receiving the message from transmitting uplink signals during the specified period. The CTS-to-Self message is ignored by stations in power save mode, and it is therefore possible that one of these stations may wake up and begin transmission during the calibration period. To avoid this possibility, access point 28 may first broadcast a delivery traffic indication message (DTIM), which is received even by stations in power save mode.

Another method to ensure that all stations remain silent during the calibration is for the access point to transmit the CTS-to-Self message repeatedly. Each time the message is retransmitted, the probability of its reception is increased. The duration field of each successive CTS-to-Self message is decreased by the amount of time that has elapsed since the last message. Thus, this method uses time-domain diversity, and may be modified to use space-time diversity by retransmitting the CTS-to-Self message from different antenna elements in alternation, or retransmitting the message using different beam patterns.

After entering calibration mode, the first step in the actual calibration procedure is computation of the DC offsets in the I and Q outputs of each receiver 68, at an offset compensation step 110. These offsets are generally caused by leakage of the local oscillator at mixers 76 or from non-zero DC levels at the inputs of A/D converters 48. The DC offsets are measured digitally by calibration processor 46, and are then compensated for digitally by calibration and phase tracking circuit 44, or else internally, in the analog domain, by transceivers 40. Compensating first for the DC offsets enables proper measurements to be made of all other calibrated values, as described below. The measurement of DC offsets is performed at each receiver, both for its I path and its Q path, by simply averaging the received signal at each of the real-sampled outputs of the receiver.

Next, calibration processor 46 measures the I/Q mismatch of each receiver 68, at a receive mismatch measurement step 111. I/Q mismatch is expressed in terms of the amplitude and phase offsets of the Q channel relative to the I channel, as illustrated in FIG. 5. To measure the receive I/Q mismatch at a given receiver, calibration signals are injected into receivers 68. To produce a constant envelope signal without the need for additional calibration hardware, one of transmitters 69 may be operated in the following way:

The transceiver used to produce the calibration signal is set to a center frequency that is offset relative to the center frequency of the receivers. The offset can be set arbitrarily, to any desired value within the receiver bandwidth (by controlling its PLL parameters). As noted earlier, these measurements may be repeated for different frequency offsets in order to determine the I/Q mismatch over the entire band of interest. A DC signal is then applied to the transmitter, producing a strong tone at the carrier frequency of the transmitting channel. The DC level is chosen so as to produce the desired level of signal in the receiving channels (maximizing signal/noise ratio without saturating the receiver).

The received tone at any given receiver input can be expressed by: $S=(I+jQ)=E\exp(j\omega t)$, wherein $\omega=2\pi f_{offset}$, and $f_{offset}$ is the frequency offset of the transmitting channel relative to the nominal center frequency of the receivers undergoing calibration.

Referring again to the model shown in FIG. 5:

$$I(t)=E\cos(\omega t)$$

$$Q(t)=(1+a)E\sin(\omega t+\beta) \quad (3)$$

wherein $A=1+a$ is the amplitude mismatch and $\beta$ is the phase mismatch, and attenuation of the wireless medium that is common to both the I and Q channels is neglected. The gain mismatch is estimated by comparing the power received in the Q-path to the power in the I-path:

$$(1\hat{+}a) = \sqrt{\frac{\langle Q^2(t)\rangle}{\langle I^2(t)\rangle}} \quad (4)$$

E is estimated by simply taking the average power of I(t) and noting that $E^2=2\langle I^2\rangle$.

The phase imbalance is estimated by multiplying the signal received in the I path by the signal received in the Q path. This operation yields a term whose magnitude is dependent on the phase imbalance:

$$I(t)\cdot Q(t) = (1+a)E^2\cos(\omega t)\sin(\omega t+\beta) \quad (5)$$

$$= \frac{1}{2}(1+a)E^2\sin(2\omega t+\beta) + \frac{1}{2}(1+a)E^2\sin\beta$$

Averaging the result of equation (5) over time filters out the term at $2\omega t$, giving:

$$\mu = \langle I(t)\cdot Q(t)\rangle = \frac{1}{2}(1+a)E^2\sin\hat{\beta} \quad (6)$$

from which $\beta$ can be calculated, since a and E are known (as estimated above):

$$\hat{\beta} = \sin^{-1}\left(\frac{2\mu}{(1+a)E^2}\right) \quad (7)$$

For each receiver, calibration and phase tracking circuit 44 applies the estimated mismatches to compensate for the actual mismatch between the received I and Q signals as follows:

$$\begin{bmatrix}\tilde{I}\\\tilde{Q}\end{bmatrix} = \begin{bmatrix}1 & 0\\-\tan\hat{\beta} & (\hat{A}\cos\hat{\beta})^{-1}\end{bmatrix}\begin{bmatrix}I\\Q\end{bmatrix} \quad (8)$$

Equation (8) is the compensation matrix for a single frequency. When IQ calibration is performed at multiple frequencies, each (non-zero) entry in the compensation matrix is replaced by a vector of entries. These vectors may be transformed to the time domain to give the compensation factors that are to be applied to the I and Q signals as tap coefficients of multi-tap digital filters in circuit 40.

The I/Q mismatches of multiple receivers may be measured simultaneously at step 111, based on the same transmitted signal. If p is the number of transceivers 40 in access point 28, transmission by transmitter 69 in one of the transceivers may be used to measure the I/Q mismatch of receivers 68 in all the remaining p-1 transceivers. Then, one of the remaining p-1 transceivers may be used to transmit signals in order to calibrate the receiver in the transceiver that transmitted previously. Additionally or alternatively, the receiver I/Q mismatch measurements may be improved by averaging over measurements taken while transmitting from different transmitters. For example, multiple different transmitters may transmit calibration signals in alternation, while the signals are received by the receivers of all the non-transmitting transceivers. The I/Q mismatch measurements of each receiver may then be averaged over the transmissions of all the other p-1 channels. Further additionally or alternatively, the measurements made using different transmitters may be compared to check consistency.

Next, calibration processor 46 measures the I/Q mismatch and LO leakage of each transmitter 69, at transmit mismatch and LO leakage measurement steps 112 and 114. The transmit mismatch, like the receive mismatch described above, may also be measured as a function of frequency and/or of gain, and the applicable correction factors may then be applied by suitable digital filters in circuit 40. In this case, as noted above, the I/Q calibration filters calculated for different gains may be saved in a memory table and then loaded by circuit 40 according to the gain in use at any given moment. Alternatively, other implementations of gain- and frequency-dependent I/Q compensation are also possible.

The compensation factors determined at step 111 are applied to the calibrated receivers that are used in calibrating the transmit I/Q mismatches. I/Q mismatch is again expressed in terms of the amplitude and phase offsets of the Q channel relative to the I channel, as illustrated in FIG. 5. To measure the transmit I/Q mismatch by a given transmitter, calibration signals are transmitted by the transmitter in question and are received by pre-calibrated receivers 68 in one or, more other transceivers 40.

The transmitter undergoing calibration transmits a set of alternating waveforms via its respective antenna 30. One or more receivers, coupled to other antennas in access point 28, receive the signals. Calibration processor 46 measures the envelope of the received signals, from which the I/Q mismatch of the transmitting channel can be estimated. The received signal envelope is simply given by the square root of the sum of squares of the received I and Q components, i.e., $\sqrt{I^2+Q^2}$.

The mismatch estimate may be further refined through an iterative process, in which the estimated transmit I/Q mismatch values are used to approximately calibrate the transmitter. The transmitter then retransmits the set of alternating waveforms, so that the residual I/Q mismatch can be estimated and used in determining more precise calibration factors. This process may be repeated as many times as desired. One possible criteria for ending this iterative process is the level of estimated residual I/Q mismatch. If this level diminishes to below some predefined threshold (to ensure image rejection of 50 dB, for example), the process is terminated.

Figure 7A:
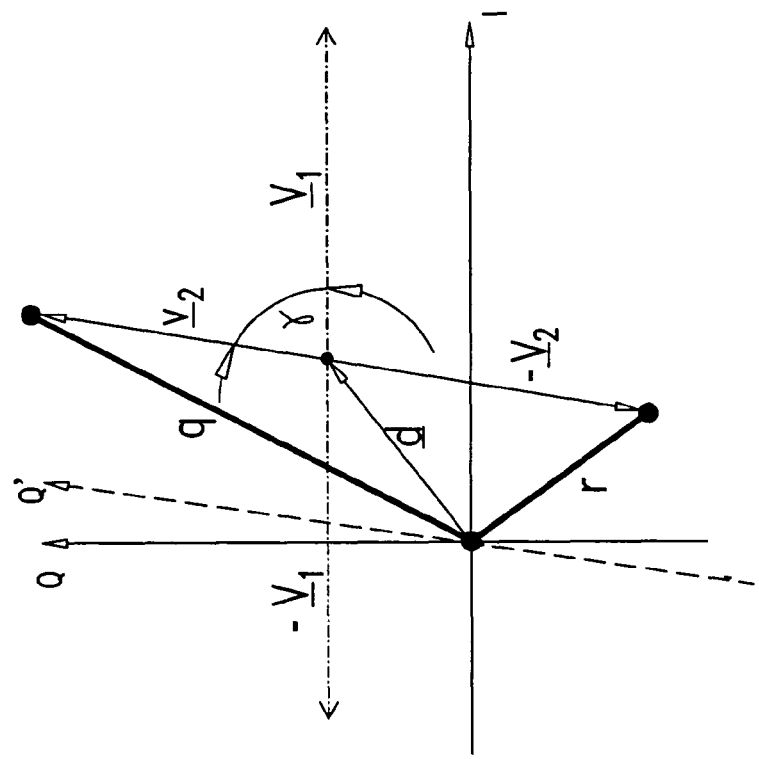
FIGS. 7A and 7B are vector diagrams that schematically illustrate signals used in calibrating an array of transceivers, in accordance with an embodiment of the present invention.
Figure 7B:
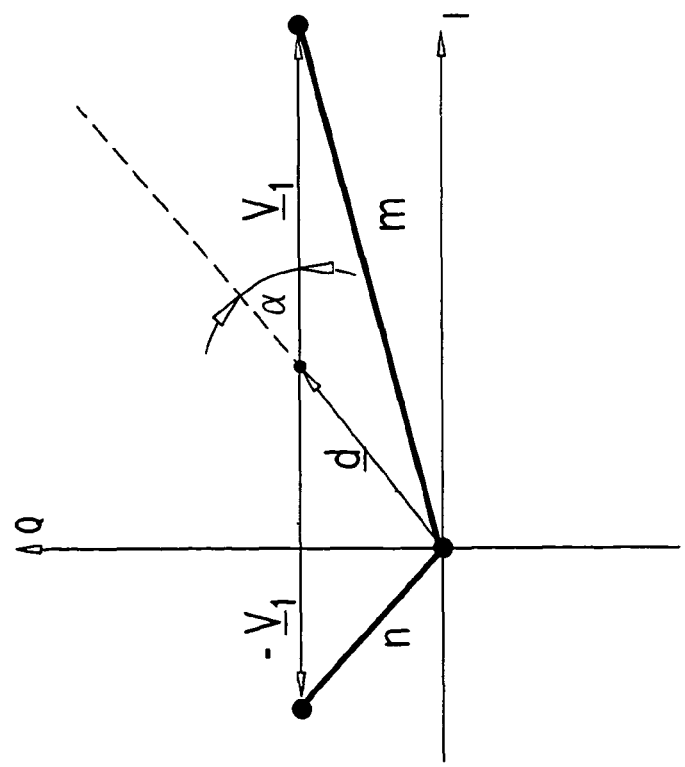

FIGS. 7A and 7B are vector diagrams that schematically illustrate calibration signals transmitted by the transmitter under test at steps 112 and 114, in accordance with an embodiment of the present invention. In addition, the figures show a measurement of the local oscillator (LO) leakage vector d, which is measured while no signals are transmitted. In this embodiment, both I/Q mismatch and LO leakage are jointly estimated through the use of only five different measurements—one performed while the transmitter is silent, and four more while transmitting known signals. Practically, the five measurements can be performed sequentially by injecting a training sequence (containing all four known signals and a silent period) from circuit 44 into the transmitter under test, and sampling the received signals at the appropriate times.

Note that the measurements may be repeated using two or more different receivers in order to obtain more precise results. Another possible approach is to use the measurements by different receivers for checking consistency, and averaging only over the consistent measurements. In either case, the measurements may be carried out by multiple receivers (and possibly by all the receivers, other than the one coupled to the transmitting antenna) simultaneously.

The training sequence starts with a fixed level signal, $\underline{v}_1$, injected into the I path only (while zero is applied to the Q path). Next, the polarity of the signal in the I path is reversed. As shown in FIG. 7A, the LO leakage vector d sums first with the transmitted in-phase signal $\underline{v}_1$ and then with $-\underline{v}_1$. Measuring the magnitudes of the vectors $d+\underline{v}_1$ and $\overline{d}-\underline{v}_1$ gives $|d+\underline{v}_1|=m$ and $|d-\underline{v}_1|=n$, wherein m and n are real scalars. The vector magnitudes are given by $\sqrt{I^2+Q^2}$, as noted above, which is linear in the signal envelope.

During the silent period of the training sequence, processor 46 measures the magnitude of the LO leakage vector, $d=|d|$. The leakage vector angle, $\alpha$, can be expressed as follows, using the law of cosines:

$$n^2 = d^2 + |\underline{v}_1|^2 - 2|\underline{v}_1|d \cos \alpha$$

$$m^2 = d^2 + |\underline{v}_1|^2 - 2|\underline{v}_1|d \cos \alpha \qquad (9)$$

Solving for $\alpha$ using $$|\underline{v}_1| = \sqrt{\frac{1}{2}(n^2 + m^2 - 2d^2)}$$

gives:

$$\alpha = \cos^{-1}\left(\frac{m^2 - n^2}{4|\underline{v}_1|d}\right). \qquad (10)$$

This solution is ambiguous, due to the symmetry of the cosine function. To resolve the ambiguity, two more signals are added to the training sequence, with opposite polarities and components in the quadrature direction. For example, in this case, circuit 44 may inject a fixed level into the Q path, while zero is applied to the I path. These signals are shown in FIG. 7B, wherein Q' represents the mismatched quadrature component, subject to both phase and amplitude mismatch relative to the in-phase component. Q' is rotated relative to the I axis by an angle $\gamma$, wherein $\gamma$ is related to the I/Q phase mismatch $\beta$ (shown in FIG. 5) by $\beta=\gamma-90°$. The two additional signals, labeled $\underline{v}_2$ and $-\underline{v}_2$, sum with the LO leakage vector d to give two new magnitude measurements: $|d+\underline{v}_2|=q$ and $|d-\underline{v}_2|=r$, wherein q and r are real scalars. Now the ambiguity in $\alpha$ is resolved simply by comparing q to r: If $q>r$, $\alpha=|\alpha|$ (positive sign), whereas if $q<r$, $\alpha=-|\alpha|$ (negative sign). If $q=r$, $\alpha$ can only be 0° or 180°, so that there is no ambiguity to resolve.

The same training sequence that was used in measuring the leakage d can also be used to determine the I/Q mismatch of the transmitter, in terms of A and $\beta$. As can be seen in FIG. 7B, accurately estimating $\underline{v}_2$ gives the angle $\gamma$, which in turn gives the phase mismatch $\beta$. Noting that the angle between $\underline{v}_2$ and d is $\alpha+\pi-\gamma$, while the angle between $-\underline{v}_2$ and $-d$ is $\gamma-\alpha$, the vector magnitudes q and r can be expressed as follows:

$$q^2 = d^2 + |\underline{v}_2|^2 + 2|\underline{v}_2|d \cos(\gamma-\alpha)$$

$$r^2 = d^2 + |\underline{v}_2|^2 - 2|\underline{v}_2|d \cos(\gamma-\alpha) \qquad (11)$$

Solving for $|\underline{v}_2|$ and $\gamma$ gives:

$$|\underline{v}_2| = \sqrt{\frac{1}{2}(q^2 + r^2 - 2d^2)} \qquad (12)$$

$$\gamma = \sin^{-1}\left(\frac{q^2 - r^2}{4|\underline{v}_2|d}\right) - \alpha. \qquad (13)$$

Since $|\underline{v}_1|$ was estimated previously, the I/Q mismatch of the transmitter is now given by $\beta=\gamma-90°$ (as noted above), and $A=|\underline{v}_2/\underline{v}_1|$. Since $\underline{v}_1$ and $\underline{v}_2$ were measured by a receiver, the calibration result is scaled back to the transmitter I/Q plane simply by scaling all magnitudes by the ratio of the estimated $|\underline{v}_1|$ to the actual, known transmitted signal amplitude. As noted above, this process is repeated for all transmitters 69, by transmitting the training signals in alternation via each of the antennas and receiving the signals at one or more other antennas. Circuit 44 is then set to compensate digitally for the estimated transmit I/Q mismatches in all the transceivers (including the LO leakage cancellation vector).

Typically, the leakage magnitude d is small compared to the transmitted calibration signals. Therefore, the limited dynamic range of the receivers in access point 28 can lead to poor precision in measurement of d. Errors in measurement of d may in turn lead to errors in calibration, especially with respect to the angles $\alpha$ and $\gamma$ (given by equations (10) and (13), in which d appears in the denominators). To address this problem, an alternative method is described below.

FIGS. 8A and 8B are vector diagrams that schematically illustrate calibration signals transmitted by the transmitter under test at step 112, in accordance with an alternative embodiment of the present invention. This embodiment is intended to alleviate the above-mentioned difficulty in accurate measurement of d. In this embodiment, instead of measuring LO leakage simply by silencing the transmitter, as described above, a DC signal, $\underline{v}_0$, is transmitted, comprising DC levels in both the I and Q signals. This signal adds to the actual LO leakage vector d to give a synthetic LO leakage vector d', as shown in FIGS. 8A and 8B. All other injected signals are now added to this synthetic "error." Proper choice of the magnitude and phase of $\underline{v}_0$ reduces the dynamic range required to perform the calibration measurements and therefore increases the accuracy of calibration, since all measurements can now be performed with high signal/noise ratio.

Using the signals shown in FIGS. 8A and 8B, the I/Q mismatch of transmitter 69 is calculated as described above with reference to FIGS. 7A and 7B, except that the angle $\alpha$ is now equal to the angle of d' in the IQ plane, and the magnitude d' is substituted for d. After solving the above equations (9) through (13), the measured magnitude and phase of d' and the known magnitude and phase of $\underline{v}_0$ are used to calculate the actual leakage vector $\underline{d}$ as follows:

$$d = \sqrt{|\nu_0|^2 + (d')^2 - 2\cos(\alpha - \angle\nu_0)} \quad (14)$$

$$\angle d = \alpha + \theta$$

$$\text{wherein } \theta = \sin^{-1}\left[\frac{|\nu_0|}{d}\sin(\alpha - \angle\nu_0)\right].$$

After calibrating the individual transmitters 69 and receivers 68, the mismatch between the receiver responses of the different transceivers are measured and compensated for, at an inter-channel receive mismatch measurement step 118. Typically, this step involves transmitting a signal from one transceiver and comparing the signals received via the other p-1 transceivers. Then another transceiver transmits the signal, enabling the response of the remaining transceiver to be compared to the other channels, as well.

When wideband transmission is required (as in 802.11 WLANs, for example), the response measurements can be performed by transmitting a sequence of tones at different frequencies, and measuring the channel responses as a function of frequency. Alternatively, to reduce the time required for calibration, a wideband signal may be transmitted, and space-time processing may be used to determine the differences in channel response at step 118. In this case, the calibration factors determined at this step will be tap coefficients of a FIR filter to be applied to each receive channel by circuit 44 in order to compensate for differences in receiver responses (or alternatively, frequency coefficients to be applied by a frequency-domain filter for this purpose).

Denoting as $\underline{g}_{r21}$ the vector of complex tap coefficients needed to compensate the received signal on channel 2, for example, for the difference in response between receivers #1 and #2, and denoting the sequences of samples received on these two channels (while transmitting from another channel, such as transmitter #3) as vectors $\underline{X}_1$ and $\underline{X}_2$, the tap coefficients may be found at step 118 by solving:

$$\underline{g}_{r21} = \arg\min_{g_{r21}} \|g_{r21}{}^H \tilde{x}_2 - \underline{X}_1\| \quad (15)$$

Here the superscript H denotes the Hermitian operator (i.e., transpose-conjugate), and $\tilde{x}_2$ is the Toeplitz matrix formed by concatenating successive time sample row vectors of $\underline{X}_2$:

$$\tilde{x}_2 = \begin{bmatrix} x_2(n) & x_2(n+1) & \ldots & x_2(n+N-1) \\ x_2(n-1) & x_2(n) & \ldots & x_2(n+N-2) \\ \vdots & \vdots & & \vdots \\ x_2(n-L+1) & x_2(n-L+2) & \ldots & x_2(n+N-L) \end{bmatrix} \quad (16)$$

wherein N is the length of the sample vector, and L is the number of taps in $\underline{g}_{r21}$.

The solution to equation (15) is given by:

$$\underline{g}_{r21} = (\tilde{x}_2 \tilde{x}_2)^{-1} \tilde{x}_2 \underline{X}_1{}^H \quad (17)$$

This method does not assume any knowledge of the transmitted signal, except that it occupies the bandwidth of interest. In this manner any pair of channels can be calibrated for inter-channel receiver mismatch by receiving a calibration signal transmitted by a third channel. Since the same transmitter is used to generate both $\underline{X}_1$ and $\underline{X}_2$, mismatches between the different transmitter responses do not matter at this step. It is also possible to calibrate more than two channels simultaneously, depending on the available computation resources in access point 28. Alternately, the captured calibration signals can be stored and processed off-line.

The inter-channel transmitter mismatch is measured in a similar fashion, at an inter-channel transmit mismatch measurement step 120. For example, one receiver may be used to sequentially capture identical calibration signals transmitted by the transmitters in two of the other transceivers. In this case, let vectors $\underline{X}_1$ and $\underline{X}_2$ represent the sequences of samples received during transmission from transmitters #1 and #2 respectively, as received and captured by the receiver on another antenna channel (for example, receiver #3). Let $\underline{g}_{t21}$ be the vector of complex tap coefficients needed to compensate the transmitter on channel #2 for the difference in response between transmitters #1 and #2. As in step 118, the tap coefficients in this case are given by:

$$\underline{g}_{t21} = (\tilde{x}_2 \tilde{x}_2)^{-1} \tilde{x}_2 \underline{X}_1{}^H \quad (18)$$

This procedure is repeated for all transmit channels. It may also be repeated for different gain settings on each channel, since inter-channel mismatch may vary as a function of the gain setting. In this case, the calibration filters calculated at different gains are saved in memory, for each of the channels, and are then recalled and applied by calibration and phase tracking circuit 40 according to the current gain settings of the transceivers.

Upon completion of step 120, the calibration procedure of FIG. 6 is concluded, and access point 28 is now ready to begin communication with stations 22, 24, 26, . . . .

Synchronization and Carrier Acquisition

The operation of multi-antenna synchronization and carrier acquisition circuit 50 (FIG. 2) will now be described. Circuit 50 operates by detecting the preamble sequences of the uplink packets transmitted by stations 22, 24, 26, . . . , while comparing the signals received from multiple antennas 30. The preamble sequences are defined by the applicable WLAN standards, such as the 802.11a, b, and g standards. Circuit 50 attempts to correlate the signal received by each of the antennas with one or more of the legal preamble sequences. By detecting the preamble, circuit 50 recovers the timing of the signal, as well. Methods for synchronization and carrier acquisition in a multi-antenna access point are described further in U.S. provisional patent application 60/556,262, filed Mar. 24, 2004, which is assigned to the assignee of the present patent application and whose disclosure is incorporated herein by reference.

Various methods may be applied by circuit 50 in order to detect the packet preamble and recover the signal timing, while taking advantage of the multiple antennas 30 and transceivers 40 in access point 28. For example, in one embodiment, circuit 50 performs a multi-antenna correlation procedure, in which the complex baseband signal $x_k(n)$ from each receiver k is individually correlated with the known preamble vector $\underline{d}$, and the correlator outputs are summed:

$$M.A.COR.\text{out}(n) = \sum_{k=1}^{p} |x_k(n) \cdot d^H|^2 \quad (19)$$

Here the summation is over the receivers, the number of samples forming the vector d is N, and $x_k(n) = [x_k(n)\ x_k(n+1)\ \ldots\ x_k(n+N-1)]$ is the vector of N samples from the $k^{th}$ antenna, starting from time index n. Alternatively or additionally, circuit 50 may choose the signal timing by majority rule, wherein the correlation is performed individually for each of the antennas, and the timing detected with respect to the largest number of the antennas is taken to be correct.

Further alternatively or additionally, circuit 50 may use a multi-antenna phase estimator for performing phase-tracking and/or carrier recovery. To this end, let $\phi_k(n)$ be the instantaneous phase, at time index n, of the signal received by the $k^{th}$ receiver 68 compared to the phase of the reference signal (the known preamble sequence). Phase offsets are estimated by the weighted sum of the phases ($\phi_k(n)$) measured for some or all of the individual receivers k at time indices n:

$$M.A.\text{Phase.out.}(n) = \tan^{-1}\left(\sum_{k=1}^{P}\sum_{m=1}^{M} A_k(n+m-1)e^{\varphi_k(n+m-1)}\right) \quad (20)$$

Here $A_k(n)$ is a real scalar proportional to the power of the signal received at antenna k. The inner summation (over m) is the time average, and the outer summation (over k) is the average over the different receivers. Averaging over time samples is permissible if the carrier offset is known to be small compared to the sample rate. The estimator given by equation (20) can be used to track phase changes. Additionally or alternatively, it can be used to estimate the frequency offset by measuring the phase gradient over time (for example, by differentiating the estimated phase between different time samples).

The techniques described above may be used in different combinations, depending, inter alia, on the types of signals used in WLAN 20. These signals may comprise, for example, single-carrier signals, as defined by the 802.11b standard, or multi-carrier signals, as defined by 802.11a or g. Exemplary implementations for these two signal types are described below:

For 802.11b signals, circuit 50 acquires synchronization using the multi-antenna correlation technique represented by equation (19), based on the known Barker spreading sequence specified by the 802.11b standard (in section 18.2.2.1). The received symbol timing is estimated to be the timing (given by the sample index n) that maximizes the multi-antenna correlation function. Multi-antenna detection, with a majority rule decision, may then be used for exact synchronization. For this purpose, circuit 50 differentially decodes consecutive spread spectrum BPSK (binary phase-shift-keyed) symbols in the signal received by each receiver in order to find the location of the known preamble sequence. Differential decoding enables circuit 50 to acquire synchronization even in the presence of relatively large carrier frequency offsets (prior to carrier frequency acquisition), based on the reasonable assumption that the phase offset from symbol to symbol is relatively small.

Finally, after determining the proper synchronization, circuit 50 acquires the carrier frequency by multi-antenna phase estimation, as given by equation (20). For this purpose, the individual receiver phases are determined by comparing the phases of the received symbols to the phase of the known preamble symbol sequence. Then, the phase gradient is estimated using a predefined number of symbols, from which the carrier offset is calculated and carrier offset compensation is applied. The symbols used for carrier offset estimation are not necessarily successive symbols. Circuit 50 may then continuously track the residual phase offsets, using the multi-antenna phase estimator in comparison to the rest of the preamble, or using hard-decisions, as is known in the art.

For 802.11a and g signals, on the other hand, circuit 50 may first apply multi-antenna phase estimation for rough carrier offset acquisition, using the known sequence of ten short symbols in the preamble or a portion of this sequence, as provided by the applicable standard (section 17.3.3 of 802.11a). This step is useful in dealing with the large (up to 250 kHz) frequency offset that is permitted by the standard, before attempting detection and exact synchronization. Circuit then acquires detection and synchronization by applying the multi-antenna correlation method to the known Long Preamble sequence or to a part of it. The maximum of the multi-antenna correlation function given in equation (19) gives exact synchronization, even in the presence of relatively large carrier frequency offsets. Since the known preamble sequence d that is used for correlation is relatively short (although termed the "Long Preamble" in the standards), frequency errors up to several tens of kilohertz are tolerable at this stage. Finally, multi-antenna phase estimation is applied again to the long preamble for exact carrier acquisition.

Although the exemplary implementations of synchronization and carrier acquisition described above relate specifically to certain members of the 802.11 family, application of the underlying multi-antenna correlation, timing detection and phase tracking techniques in other wireless communication environments will be apparent to those skilled in the art and is considered to be within the scope of the present invention.

Defining and Communicating with Spatial Multiplexing Groups

Figure 9:
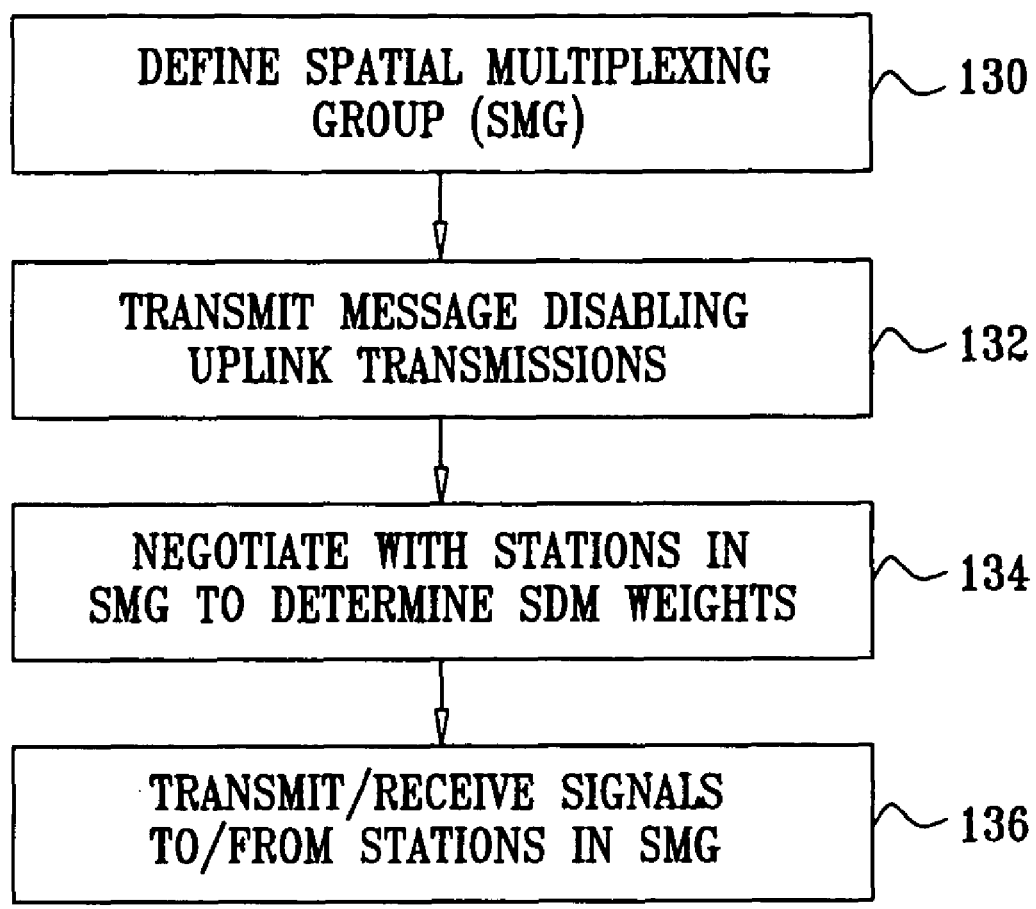
FIG. 9 is a flow chart that schematically illustrates a method for communication between an access point and a spatial multiplexing group (SMG), in accordance with an embodiment of the present invention.

FIG. 9 is a flow chart that schematically illustrates a method by which access point 28 forms and communicates with spatial multiplexing groups of stations in WLAN 20, in accordance with an embodiment of the present invention. The method is described here in overview. Specific elements of the method are described below in greater detail with reference to the figures that follow.

Embodiments of the present invention that are described in this patent application assume that stations 22, 24, 26, ..., are conventional 802.11 mobile stations, which operate in accordance with one or more of the standards in the 802.11 family. Ordinarily, such stations transmit uplink signals to access point 28 at will, subject to the clear channel assessment (CCA) collision avoidance mechanism dictated by the 802.11 standard. This mechanism requires a station to refrain from transmitting when it senses other transmissions on its frequency channel. Similarly, a conventional 802.11 access point transmits downlink signals to only one station at a time.

In WLAN 20, however, access point 28 overcomes this limitation by defining a spatial multiplexing group (SMG), at a SMG definition step 130. The group members are selected by STS 60 (FIG. 2) based on the characteristics of the uplink signals received from the stations in the WLAN. An exemplary method for selecting the members of a SMG is described below with reference to FIGS. 12 and 13. The SMG typically comprises a subset of the stations in the service area of access point 28, but may in some cases include all the stations. In other cases, access point 28 may use the beamforming capabilities of receive SDM 54 and transmit SDM 64 to communicate more efficiently with just a single station. Typically, after transmitting and receiving signals to and from the members of a given SMG for a certain period of time, the access point goes on to define and exchange signals with another SMG. Membership in any given SMG is generally dynamic, and changes over the course of time depending on the locations of stations in the WLAN and other network conditions. After selecting the members of the current SMG at step 130, the next object of access point 28 is to determine beamforming weights for the SMG members, and then to transmit downlink packets to these members and receive uplink packets from the members, using the weights, without interference from other transmissions.

For this purpose, the access point transmits a special downlink message that causes all stations receiving the message to refrain from uplink transmissions for a predetermined period, at an uplink disabling step 132. For example, STS 60 may instruct MAC processor 58 to transmit a DTIM, as described above. This message is received by all stations in WLAN 20 (even those currently in Power Save mode). The DTIM includes a broadcast bit, which is set to "1", instructing all stations to wait for a broadcast message. Immediately after the DTIM, the STS instructs the MAC processor to transmit a CTS-to-Self message, as was also described above, announcing to all stations that the wireless channel is about to be occupied for a certain period that is specified by the duration field in the CTS-to-Self message. The CTS-to-Self message disables all stations from transmitting uplink signals during the specified period.

From this time up to the end of the specified period, access point 28 can freely transmit downlink signals with minimal risk of collision. It now performs a negotiation process with the stations in the selected SMG, in order to determine SDM weights for the members of the group, at a weight negotiation step 134. The negotiation and weight calculation process is described hereinbelow in detail with reference to FIG. 11. Since the wireless media in WLAN 20 are known to vary in time, the calculated spatial weights have a finite valid period (which may be no more than several tens of milliseconds, depending on the actual environmental characteristics). Therefore, immediately after determining the SDM weights, access point 28 begins communication with the members of the current SMG, using the weights, at a packet exchange step 136.

To this end, access point 28 uses the DTIM/CTS transmitted at step 132 as a channel allocation mechanism, to determine how the wireless media of WLAN 20 are to be used for a certain period of time thereafter. STS 60 may be configured to transmit the DTIM/CTS periodically, or it may choose to transmit the DTIM/CTS only at certain times, depending on communication traffic, for example. The period allocated for downlink transmission may be stretched by retransmitting the CTS-to-self message at the end of the period, announcing another period during which uplink transmission is disabled. When this channel allocation mechanism is not in effect, the stations in WLAN 20 may transmit packets freely (subject to CCA collision avoidance requirements), as in a conventional WLAN.

As a variation on the methods described above, after transmitting the CTS-to-Self message at step 132, access point 28 may further transmit a broadcast message enabling the stations awakened by the DTIM to go back to their power-save mode. In this case, however, power-saving remote stations will no be longer listening to the access point. Therefore, if the access point prolongs the allocated downlink period by retransmitting the CTS-to-Self message, there is a risk that power-saving remote stations will "wake up" and begin uplink transmission during the downlink period. This risk is small, however, as the 802.11 standard requires stations to sense the wireless channel before transmission in any case.

The methods of wireless channel allocation described above may also be used without SDM transmission in order to improve WLAN performance by reducing the probability of collisions. Use of these methods also eliminates the need for access point 28 to adhere to the usual collision avoidance requirements of the 802.11 standard, and thus enable the access point to transmit consecutive bursts with almost no guard time between bursts. This feature further improves the efficiency of wireless channel exploitation.

FIGS. 10A and 10B are timing diagrams that schematically illustrate methods for wireless channel allocation based on the principles described above, in accordance with embodiment of the present inventions. In these embodiments, the access point transmits a message pair, consisting of a DTIM 140 and a CTS-to-Self message 142, periodically (typically once in each beacon interval, as defined by the 802.11 standard). The DTIM/CTS pair is followed immediately by a downlink transmission period 144, and then by an uplink transmission period 146. This messaging techniques thus divides the bandwidth in WLAN 20 into dedicated downlink and uplink sections, using the CTS-to-Self duration field to determine the lengths of the sections.

FIG. 10A shows a static partitioning of the bandwidth on this basis, while FIG. 10B shows a dynamic partitioning, which may be adapted to the uplink and downlink loads in the WLAN. In both cases, every CTS-to-Self message 142 announces the duration of the downlink period 144 that is to follow. All stations receiving this message know that the channel is about to be occupied for the specified duration. In the static allocation scheme, the CTS-to-Self message always carries the same duration value, as opposed to the dynamic allocation scheme, in which the duration field carried by the CTS-to-Self message is updated according to the instantaneous loads.

If a dynamic partitioning is used, access point 28 may dedicate a whole DTIM period for downlink transmission only or for uplink only. The allocation of an entire DTIM period for downlink can be achieved by transmitting a CTS-to-Self message with duration field equal to the duration left until the next beacon. Allocation of a whole DTIM period for uplink can be achieved simply by not transmitting the CTS-to-Self message after the DTIM. Thus, for example, the final DTIM 140 that is shown in FIG. 10B is not followed by a CTS-to-Self message, and is therefore followed immediately by uplink period 146. Alternatively, the DTIM could be omitted in this case.

Furthermore, uplink period 146 may also be used for downlink transmissions. In this case, access point 28 has no special privileges and is obliged to use the collision avoidance mechanism specified in the 802.11 standard, including backoff and channel assessment. This option is useful in cases in which the access point is heavily loaded (with long queues of data packets waiting for downlink transmission). Even in such cases, it is still desirable to allocate some uplink time in order to avoid "uplink starvation," while still permitting the access point to use the uplink period for downlink transmission if the access point detects that the channel is free.

Weight Calculation

Weight calculation circuit 52 determines the beamforming weights to use for the stations in the current SMG at step 134 (FIG. 9) by analyzing the uplink signals received from each of the stations by transceivers 40. In some embodiments of the present invention, the uplink signals used in the weight calculation may be received from all the stations in the group simultaneously (or almost simultaneously), and circuit 52 may determine a set of weight vectors on this basis. The computation complexity of this approach, however, may be prohibitive. Furthermore, because all of stations 22, 24, 26, . . . , typically use the same preamble in their uplink packets, it may be difficult to distinguish the uplink signals when two stations transmit simultaneously. A possible solution to this problem, using packet header information, is described in the above-mentioned provisional patent application 60/556,262.

FIG. 11 is a flow chart that schematically shows details of weight negotiation step 134, in accordance with another embodiment of the present invention. This method is based on first finding a "spatial signature" of each station in the SMG, and then using the signatures to calculate the weights for the entire group. For this purpose, access point 28 prompts each of the stations in the SMG to transmit individually, in sequence, at a transmission prompting step 150. This sort of prompting can also be used to cause a single station to transmit individually later on, if it is necessary to update the spatial signature to account for changes in the wireless channel.

Typically, at step 150, access point 28 uses standard messaging provided by the 802.11 standard in order to prompt the desired station to transmit an uplink signal. For example, the access point may send the station a packet containing null data, which will cause the station to return an acknowledgment (ACK) packet. As another example, the access point may send a request to send (RTS) message to the station, which will then respond with a clear to send (CTS) message. The use of RTS at step 150 is limited to the last member of the current SMG (or to cases in which the beamforming weights are to be determined for only a single station), since the 802.11 standard requires that data transmission start immediately after the CTS transmission.

If circuit 52 has already computed beamforming weights for the current SMG, and step 150 has been initiated in order to update the weights, the downlink message sent at this step may be transmitted by all of antennas 30, using the previously-calculated weights. Alternatively, if there is no prior beamforming data available, it may be preferable to transmit the downlink message at step 150 using only a single transceiver, while the other transceivers are silent. Typically, in this case, the access point chooses to transmit via the "best" transceiver for the station in question, i.e., the transceiver that received the most recent uplink signal from this station with the highest power. This choice increases the probability that the station will correctly receive the prompt.

In response to the prompt at step 150, access point receives the expected uplink signal from the given station, at a signal reception step 152. As noted above, the uplink signal may typically comprise an ACK or CTS message. Weight calculation circuit 52 uses the known preamble of the uplink message to estimate a spatial signature for the station, at a signature calculation step 154. The spatial signature may be expressed as a column vector $\underline{a}_j$, for station j, which is given by:

$$\underline{\hat{v}}_j = x \underline{d}_j^H \tag{21}$$

Here $\underline{d}_1$ is the known preamble vector for this station, and x is the reception matrix, given by the input sample stream from the p transceivers, as follows:

$$X(n) = \begin{bmatrix} x_1(n) & x_1(n+1) & \ldots & x_1(n+N-1) \\ x_2(n) & x_2(n+1) & \ldots & x_2(n+N-1) \\ \vdots & \vdots & & \vdots \\ x_p(n) & x_p(n+1) & \ldots & x_p(n+N-1) \end{bmatrix} \tag{22}$$

wherein $x_i(n)$ is the sample taken at instant n from antenna i, N is the length (in samples) of the known preamble, and n is the time-index in X at which the known sequence $d_j$ is located.

Alternatively, a space-time estimate of $\underline{a}_j$ can be obtained by replacing X with its block-Toeplitz form $\tilde{x}$ given by:

$$\tilde{x}(n) = \begin{bmatrix} x_1(n) & x_1(n+1) & \ldots & x_1(n+N-1) \\ x_1(n-1) & x_1(n) & \cdots & x_1(n+N-2) \\ \vdots & \vdots & & \vdots \\ x_1(n-L+1) & x_1(n-L+2) & \ldots & x_1(n+N-L) \\ \hline x_2(n) & x_2(n+1) & \ldots & x_2(n+N-1) \\ x_2(n-1) & x_2(n) & \cdots & x_2(n+N-2) \\ \vdots & \vdots & & \vdots \\ x_2(n-L+1) & x_2(n-L+2) & \ldots & x_2(n+N-L) \\ \hline \vdots & \vdots & & \vdots \\ \hline x_p(n) & x_p(n+1) & \ldots & x_p(n+N-1) \\ x_p(n-1) & x_p(n) & \cdots & x_p(n+N-2) \\ \vdots & \vdots & & \vdots \\ x_p(n-L+1) & x_p(n-L+2) & \cdots & x_p(n+N-L) \end{bmatrix} \tag{23}$$

In this case, $\underline{\hat{a}}_j$ is a $p_x L$ column vector, in which the first L successive members represent the channel response for the first antenna—$\underline{\hat{a}}_{1,j}$, the next L members are for the second antenna—$\underline{\hat{a}}_{2,j}$, etc., up to the last L members, which represent the channel response for the $p^{th}$ antenna—$\underline{\hat{a}}_{p,j}$:

$$\underline{\hat{a}}_j = \begin{bmatrix} \hat{a}_j(1) \\ \vdots \\ \hat{a}_j(L) \\ \hline \hat{a}_j(L+1) \\ \vdots \\ \hat{a}_j(2L) \\ \hline \vdots \\ \hline \hat{a}_j((p-1)L+1) \\ \vdots \\ \hat{a}_j(pL) \end{bmatrix} = \begin{bmatrix} | \\ \underline{\hat{a}}_{1,j} \\ | \\ \hline | \\ \underline{\hat{a}}_{2,j} \\ | \\ \hline \vdots \\ \hline | \\ \underline{\hat{a}}_{p,j} \\ | \end{bmatrix} \tag{24}$$

Another possible estimation of the spatial signature $\underline{a}_j$ is given by:

$$\hat{a}_{i,j} = \underset{a_{i,j}}{\operatorname{argmin}} \left\| x_i - a_{i,j}^H D_j \right\|^2 \tag{25}$$

Here, $\hat{a}_{i,j}$ represents the spatio-temporal channel response for the $i^{th}$ antenna and station j, $x_i$ is the vector of samples from the $i^{th}$ antenna and $D_j$ is the Toeplitz form of the known preamble row vector $\underline{d}_j$ given by:

$$D_j = \begin{bmatrix} d_j(1) & d_j(2) & \ldots & d_j(N) \\ d_j(2) & d_j(3) & \ldots & d_j(N+1) \\ \vdots & \vdots & & \vdots \\ d_j(L) & d_j(L+1) & \ldots & d_j(N+L-1) \end{bmatrix} \tag{26}$$

In this case, the solution for $\hat{a}_{i,j}$ is given by:

$$\underline{\hat{a}}_{i,j} = (D_j D_j^H)^{-1} D_j \underline{x}_i^H \tag{27}$$

The above procedure (steps 150-154) is typically repeated in sequence for all the stations in the current SMG. In order to minimize the amount of time needed to collect all the spatial signatures, the stations in the SMG may be prompted to transmit with only a very short delay from one to the next, so that the uplink signals received at step 152 partially overlap. The time delay between each two successive stations should be longer than the expected delay-spread of the channel, which may typically be up to about 100-150 ns. Therefore a temporal separation between stations of about 200 ns is typically sufficient. Since the minimal preamble duration in an 802.11 environment is 16 µs, there is still a substantial period during which all stations in the SMG share the channel (depending on the number of stations), while temporal resolution between the uplink transmissions is maintained. In this case, the samples in X (equation (22)) will comprise a superposition of the signals transmitted simultaneously by the different stations, but the signature for each station is still given by equation (25) (by taking different overlapping segments of X).

Weight calculation circuit 52 uses the signals received at step 152 and the spatial signatures calculated at step 154 to calculate beamforming weights for all the stations in the SMG, at a weight calculation step 156. These weights are used subsequently by both receive SDM 54 and transmit SDM 64 (although the receive and transmit weights for any given station may be different, as noted earlier). Further aspects of the weight calculation step will now be described.

In some embodiments, the spatial signature for each station in the SMG is calculated, in the frequency domain, individually for each of a plurality of frequency bins at step 154. The beamforming weights are then calculated at step 156 by orthogonalizing the spatial signatures per bin. For this purpose we define a signature matrix $A(f_k)$ by concatenating the spatial signatures $\underline{a}_j$ of the m stations in frequency bin $f_k$:

$$A(f_k) = [\underline{a}_1(f_k) \underline{a}_2(f_k) \ldots \underline{a}_m(f_k)] \quad (28)$$

Note that $A(f_k)$ is a $p \times m$ matrix, and $\underline{a}_j(f_k)$ is a complex column vector.

At step 156, circuit 52 attempts to find m weight vectors such that upon applying the weight vector for station j to signals transmitted or received by the p antennas to or from this station, the normalized power for this station is 1, while the power "leaking" to other stations from station j is zero. In matrix notation, circuit 52 searches for a weight matrix $W(f_k)$ that satisfies $W(f_k)A(f_k)=I$, wherein I denotes the $m \times m$ unity matrix. The solution to this problem in the general case, when $A(f_k)$ is not a square matrix, is the pseudo-inverse of $A(f_k)$ (sometimes denoted $A^\dagger(f_k)$), given by:

$$W(f_k) = (A^H(f_k)A(f_k))^{-1}A^H(f_k) \quad (29)$$

Here $W(f_k)$ is the concatenation of weight vectors for the different stations, and $\underline{w}_j(f_k)$ is the $p \times 1$ column weight vector for the $j^{th}$ station, at frequency bin $f_k$:

$$W(f_k) = \begin{bmatrix} | & | & & | \\ \underline{w}_1(f_k) & \underline{w}_2(f_k) & \ldots & \underline{w}_m(f_k) \\ | & | & & | \end{bmatrix} \quad (30)$$

Although not optimal, this method involves only small matrix inversions ($m \times m$ for each frequency bin). For p=6 and m=4, for example, the method involves only inversions of a 4×4 matrix per frequency bin and was found to give close to optimal performance.

The method of frequency-domain orthogonalization that is described above may be generalized for operation in the presence of interfering signals. In this case, the spatial signatures of the interferers are estimated (for example, by receiving signals while stations 22, 24, 26, . . . , are silent). These interferer signatures are then concatenated with the spatial signatures of the actual signals of interest (SOI) received at step 152, to define an extended signature matrix:

$$\tilde{A}(f_k) = [\underline{a}_{SOI_1}(f_k) \ldots \underline{a}_{SOI_l}(f_k) | \underline{a}_{Interfer_1}(f_k) \ldots \underline{a}_{Interfer_n}(f_k)] \quad [\text{equation (31)}]$$

The matrix $\tilde{A}(f_k)$ may include up to p discrete spatial signatures (columns), so that up to p-m interferer spatial signatures may be concatenated with the signatures of the signals of interest. The extended signature matrix is used to calculate the orthogonalized weight vectors for the m stations in the SMG:

$$\tilde{W}(f_k) = (\tilde{A}^H(f_k)\tilde{A}(f_k))^{-1}\tilde{A}^H(f_k) \quad (32)$$

An alternative method for calculating SDM weights in access point 28 is to find a solution that minimizes the distortion in the signal received from each individual station and the interference due to other stations. For this purpose, let $X_j$ be a $p \times N$ matrix representing the complex baseband sampled signals received by all p transceivers from station j over N time samples. The weight vector $\underline{w}_j$ for station j is chosen so as to minimize the following cost function:

$$J_1 = \left[ \sum_{\substack{q=1 \\ q \neq j}}^{m} \|\underline{w}_j^H X_q\|^2 + \|\underline{w}_j^H X_j - \underline{d}_j\|^2 \right] \quad (33)$$

The term $\|\underline{w}_j^H x_j - \underline{d}\|^2$ in this equation maximizes the similarity of the signal from station j to the expected preamble vector $d_j$. The object of all the other terms is to minimize the interfering power from other stations, thus maximizing the signal/interference ratio for station j.

The solution to equation (33) is given by:

$$\underline{w}_j = \left( \sum_{i=1}^{m} X_i X_i^H \right)^{-1} X_j \underline{d}_j^H \quad (34)$$

This solution merges the information contained in the signals received from all the stations by summing their estimated covariance matrices $R_i = X_i X_i^H$. The method may be further generalized by introducing respective weighting factors $\lambda_i$ to the terms in the sum of equation (33). In this case, the solution for the weight vectors becomes:

$$\underline{w}_j = \left( \sum_{i=1}^{m} \lambda_i X_i X_i^H \right)^{-1} X_j \underline{d}_j^H \quad (35)$$

The weighting factors $\lambda_i$ are non-negative real scalars, which are chosen in order to set priority levels for the different terms in the cost function. For example, these factors may be chosen to enable more effective minimization of interferers, at the cost of leaving some uncorrected distortion of the desired signal, by giving greater weight to $\lambda_i$ for $i \neq j$ than for i=j. Typically, demodulators 56 comprise equalizers, as are known in the art, which are capable of compensating for residual distortion left by the receive SDM 54 (but cannot remove the remaining co-channel interference). Thus, judicious selection of the weights in equation (35) can be used to achieve better interference reduction, while leaving some distortion to be corrected by the equalizers in the demodulator.

The weight vectors derived above may also be calculated by transforming the signals received at step 152 to the frequency domain, using a Fast Fourier Transform (FFT), for example, and then calculating the SMG weight vectors for each station j at each frequency-bin individually:

$$\underline{w}_j(f_k) = \left(\sum_{i=1}^{m} \lambda_i X_i(f_k) X_i^H(f_k)\right)^{-1} X_i(f_k) \underline{d}_j^H(f_k) \quad (36)$$

Here $\underline{w}_j(A)$ is the $p \times 1$ column weight vector for the $j^{th}$ station in frequency bin $f_k$, $X_i(f_k)$ is frequency-domain reception matrix for the $i^{th}$ station in frequency bin $f_k$, and $\underline{d}_j(f_k)$ is the frequency-domain representation of the reference sequence $\underline{d}_j$.

In this case, receive SDM 54 may also operate in the frequency domain, by transforming the subsequent uplink signals from each antenna to the frequency domain, weighting each bin by the appropriate calculated complex weight, summing the weighted bin results from the different antennas, and finally retransforming the signal to the time-domain (if required). Alternatively, the frequency-domain weights may be transformed back to the time-domain, to determine tap coefficients for a set of finite impulse response (FIR) filters used for beamforming in receive SDM 54.

As noted earlier, the optimal weighting vectors to be applied by transmit SDM 64 are not necessarily identical to those applied by receive SDM 54. The difference stems from the fact that the receive SDM can be viewed as a set of individual filters, one serving each of the stations in the current SMG. Thus, the weight vector $\underline{w}_j$ for station j does not affect the beamformed signal that is passed to demodulators 56 for station $i \neq j$, and vice versa. On the other hand, each of the stations in the SMG is affected by the downlink signals transmitted by access point 28 to the other stations in the SMG. Therefore, each station is also affected by the weight vectors used in transmit SDM 64 to generate the beamformed downlink signals for transmission to the other stations in the SMG. Hence, in finding the transmit SDM weights, it is generally advantageous to solve the optimization problem jointly over all the stations in the SMG.

In one embodiment, weight calculation circuit 52 solves this joint optimization problem by minimizing the interference-to-signal ratio jointly for all users:

$$W = \operatorname*{argmin}_{\underline{w}_1 \ldots \underline{w}_m} \sum_{j=1}^{m} \lambda_j \frac{\sum_{i \neq j} \underline{w}_i^H R_j \underline{w}_i}{\underline{w}_j^H R_j \underline{w}_j} \quad (37)$$

Here W is the weight matrix containing the concatenated individual complex weight vectors $\underline{w}_1, \ldots, \underline{w}_m$ for the stations in the SMG, and $R_j$ is the estimated covariance matrix defined above. The outer summation is over all stations and includes non-negative real weighting factors $\lambda_j$. The inner summation represents the sum of powers from all the other downlink signals that interfere with the signal directed to station j, wherein the denominator represents the power of the signal directed to this station.

Equation (37) may be solved iteratively using the procedure:

Set $\underline{w}_j = \underline{u}_j \sqrt{P_j}, \underline{u}_j^H R_j \underline{u}_j = 1$ For n=1, 2, . . .

1. $\underline{u}_i^n$ = minimal eigenvector of $R_i^{-1}\left(\sum_{k \neq i} \frac{\lambda_k}{P_k^n} R_k\right)$ 2. $P_i^{n+1} = \sqrt{\lambda_i \frac{\sum_{k \neq i} P_k^n \underline{u}_k^{nH} R_i \underline{u}_k^n}{\sum_{k \neq i} \frac{\lambda_k}{P_k^n} \underline{u}_i^{nH} R_k \underline{u}_i^n}}$ This solution is computationally complex, but can be simplified by finding the weight vectors separately for each frequency-bin.

Equation (37) involves only maximizing and minimizing of powers received at some user. Alternatively, the criterion of equation (37) may extended by adding a factor expressing the object that the signal received by station j be as close as possible (in the least-mean-square sense) to the signal $\underline{d}_j$ transmitted to station j, with power $P_j$ (wherein $\underline{d}_j$ is normalized to have unit power):

$$W = \operatorname*{argmin}_{\underline{w}_1 \ldots \underline{w}_m} \sum_j \lambda_j \frac{\left\|\underline{w}_j^H X_j - \sqrt{P_j}\, \underline{d}_j\right\|^2 + \sum_{k \neq j} \|\underline{w}_k^H X_j\|^2}{P_j} \quad (38)$$

This equation may again be solved iteratively, using the following procedure:

For n=1, 2, . . .

1. $\underline{w}_k^H = \frac{\lambda_k}{\sqrt{P_k}} \left(\sum_i \frac{\lambda_i}{P_i^n} R_i\right)^{-1} X_k \underline{d}_k^H$ 2. $P_k^{n+1} = \left(\frac{\sum_i \|\underline{w}_i^{nH} X_k\|^2}{Re\{\underline{w}_k^{nH} X_k \underline{d}_k^H\}}\right)^2$.

This procedure involves inversion of the summed covariance matrix, but does not require solution of an eigenvalue problem. It is therefore computationally simpler than the solution of equation (37) given above. Equation (38) can also be simplified by dividing the problem into frequency bins, in the manner described above.

Formation of Spatial Multiplexing Groups

FIG. 12 is a block diagram that schematically shows functional elements of STS 60, in accordance with an embodiment of the present invention. The STS comprises a mapper 160, which filters downlink data packets 164 that are prepared for transmission by MAC processor 58 in order to sort the packets into queues 162 according to the stations to which the packets are addressed. Typically, the number of queues is equal to the number of stations served by access point 28. Mapper 160 marks each queued packet with a time-of-arrival tag (TAT), which is subsequently used to determine how long the packet has been waiting for transmission. For each queue, a specific data block (SDB) 166 holds information concerning the station to which the queue belongs, such as:

Received power of uplink signals from the station.
Supported data rates (factory setting).
Maximum available data rate (over the current wireless channel).
Spatial signature.
Error statistics.

These parameters are updated whenever new data become available.

Depending on the respective lengths of queues 162 and the information in SDBs 166, a SMG decision unit 168 chooses the members of each successive SMG to be served by access point 28. Based on this grouping, one or more packets 164 are drawn from each of the queues belong to the group, and are then passed from MAC processor 58 to modulators 62 for transmission.

Additionally or alternatively, each queue may be assigned a respective quality of service (QoS) level, and decision unit 168 may take the QoS into account in selecting the members of the SMG. If WLAN 20 is configured so that a given station may transmit and/or receive packets with K different QoS levels, STS 60 may comprise up to K queues 162 for each station, one queue for each QoS level. Each of these queues may be treated as a different station for the purpose of choosing SMG members according to the procedure described below.

Figure 13:
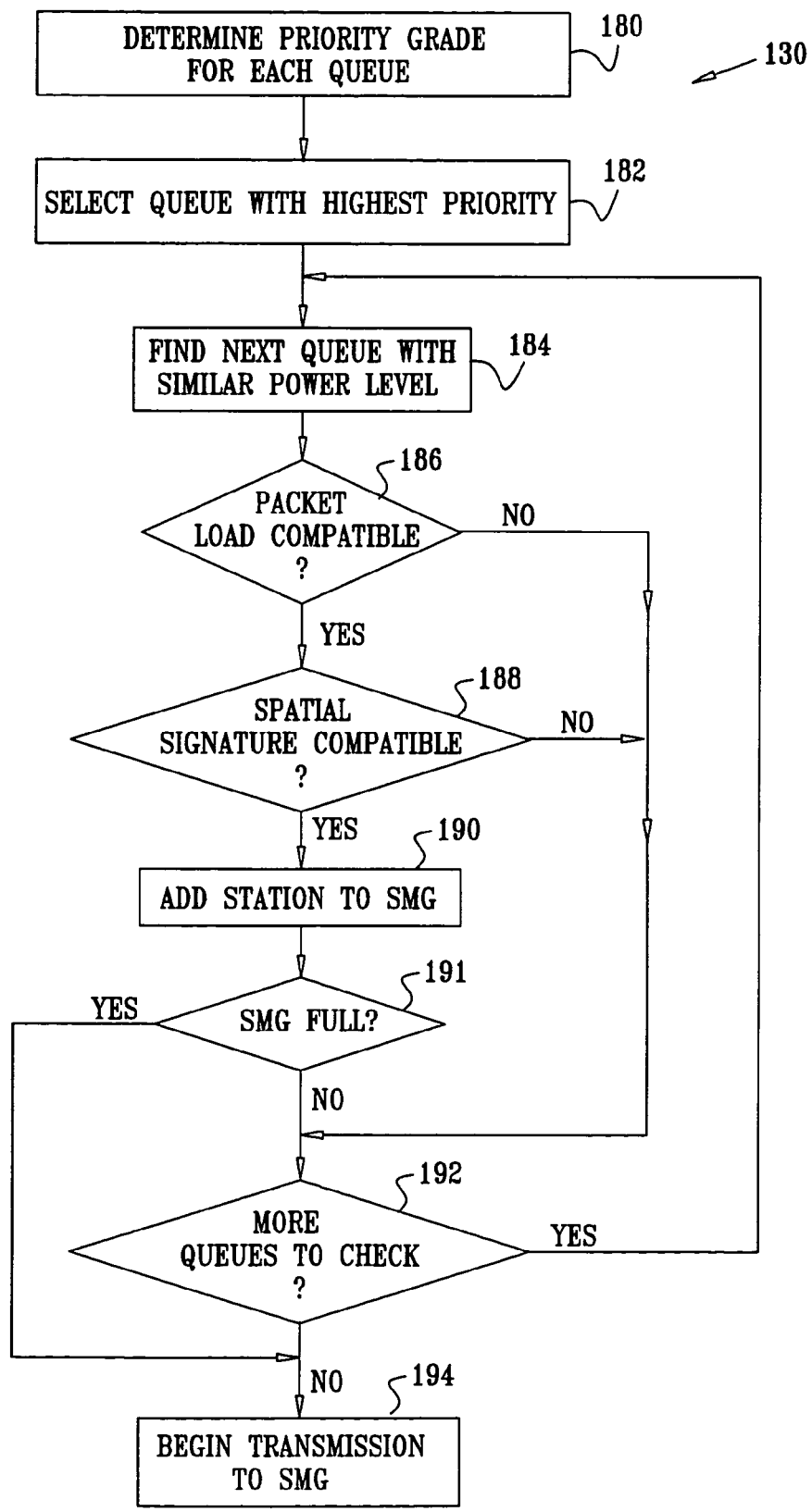
FIG. 13 is a flow chart that schematically illustrates a method for selecting stations for inclusion in a SMG, in accordance with an embodiment of the present invention.

FIG. 13 is a flow chart that schematically shows details of SMG definition step 130, as performed by STS in accordance with an embodiment of the present invention. Decision unit 168 begins this step by calculating a priority grade for each queue 162, at a priority determination step 180. Typically, for this purpose, unit 168 may consider the following factors:

Accumulated load in the queue (for example, the total number of data bytes in the queue).
Length of the first (oldest) packet in the queue (typically expressed in terms of the time that will be required to transmit the packet at the maximum available rate).
Age of the first packet in the queue (based on the packet TAT and the current time).

A queue may get a higher priority grade if its accumulated load is high and/or if its first packet is old and/or if its first packet is long. The priority grading function strongly affects the behavior of access point 28 and may be varied in order to achieve different performance goals. For example, to enhance throughput at the risk of starvation of some stations with low load, the packet age should be weighted lightly or not at all.

STS 60 then assigns a priority score to each queue, at a queue selection step 182, based on the priority grades determined at step 180. The priority score could simply be equal to the priority grade. Alternatively, some randomization may be introduced into the priority scores in order to enhance the fairness of the scheme and avoid starvation of low-priority queues. Thus, for example, decision unit 168 may randomly draw the score for each of queues 162 from a uniform distribution in the range [0,$PM_i$], wherein $PM_i$ is the priority measure associated with queue i. Unit 168 then chooses the queue that has the highest score as the first member of the new SMG.

Having selected the first member, decision unit 168 proceeds to add other members to the SMG. For this purpose, the decision unit first checks the power levels stored in SDB 166 of each queue, in order to find another queue with power level that is within a predetermined range of the power level of the first SMG member, at a power evaluation step 184. It is desirable that all members of the SMG have comparable power levels, so that signals to and from the stations in the SMG can all be transmitted at the optimal power level for these stations. Large power differences cause severe signal/interference problems for the weaker members of the group, while downgrading the power and/or data rate of the stronger members to accommodate the weaker members wastes the available bandwidth.

After finding a queue with similar power level to that of the first SMG member, decision unit 168 checks the packet load in the queue, at a load checking step 186. After the SMG has been formed and SDM weights have been calculated (step 134, FIG. 9), STS 60 will attempt to empty the queue of the first SMG member, or at least to transmit several packets from the queue in rapid succession. This approach maximizes exploitation of the SMG for traffic throughput relative to the overhead involved in forming the SMG and negotiating the SDM weights. Therefore, at step 186, unit 168 attempts to add to the SMG other queues whose respective loads are within a predetermined range of the first queue in the SMG. Additionally or alternatively, unit 168 may attempt to add queues whose first packet is similar in length to the first packet of the first queue in the SMG. This latter selection criterion is useful particular in alternative configurations of STS 60, in which only a single packet is transmitted from each member queue before selecting a new SMG.

Among the queues that were found at steps 184 and 186 to have similar power levels and packet loads to the first SMG member, decision unit 168 next searches for queues whose spatial signatures are compatible with those of the existing members of the group, at a signature compatibility checking step 188. "Compatible" in this context means substantially different, since similarity between the spatial signatures of two group members is likely to result in mutual interference. One method for determining that the spatial signatures are substantially different is to check the rank of the covariance matrix of the spatial signatures. An approximate measure of the rank can be calculated by finding the value of the ratio:

$$\frac{[\text{trace}(A^H A)]^2}{\text{trace}[(A^H A)^2]} \tag{39}$$

wherein A is the matrix of spatial signatures of the stations in the SMG, as defined above. For a Hermitian matrix, this ratio is known to be less than or equal to the rank of $A^H A$. If the ratio is found to be much smaller than the dimension of $A^H A$ (i.e., than the number of spatial signatures in A), it implies that the rank is not full, and the latest added candidate queue should be rejected as it is evidently not substantially different from at least one of the other candidates already in the group.

When one of queues 162 is found to meet the criteria of steps 184, 186 and 188, decision unit 168 adds the corresponding station to the current SMG, at a queue addition step 190. Alternatively, some of the steps above may be omitted, or may be performed in a different order. Further alternatively or additionally, other selection criteria may be applied, such as the transmission rate that the candidate station is able to maintain. The decision unit continues to check the queues holding packets 164 for transmission until the SMG has its full complement of m members, at a check filling step 191, or until it has finished checking all of the queues, at a check completion step 192. The decision unit then instructs MAC processor 58 to begin transmission of the packets, at a transmission initiation step 194. Typically, transmission begins with disabling uplink transmissions, at step 132 (FIG. 9), and continues as described above.

When transmitting downlink packets to the members of the SMG at step 136, it is desirable that the packet lengths (in terms of the time needed for transmission at the appropriate rates) be similar, so that the uplink acknowledgment packets transmitted by the stations in the SMG will be received simultaneously at access point 28. (Otherwise, one of the stations may transmit its acknowledgment packet while the access point is still transmitting a downlink packet to another station, and the access point will therefore fail to receive this acknowledgment packet.) Zero padding of the data in short packets may be used to make up small length differences, but it is wasteful of bandwidth when the length differences are larger. In these cases, the transmission rates may be modified in order to roughly equalize the packet lengths, with zero padding added to make up any remaining differences.

Under some circumstances, STS 60 may choose to reduce the number of members of an existing SMG after communication has begun between access point 28 and the stations in the SMG. A new SMG is thus defined on the fly, as a subset of the previous SMG. This technique may be useful under various circumstances, for example, when the queues of one or more members of the SMG become empty, or contain data packets that are too short to be spatially multiplexed with the packets to be transmitted to the other members. Removing the members whose queues are empty or short permits the power transmitted to the remaining members to be increased, thus enhancing SMG performance. As another example, if the SDM weights have aged (for one or more of the members or the entire group), resulting in a decrease in performance, removing one or more of the stations in the group may improve performance for the remaining members.

SDM Transmission Rate Adjustment

As noted above, access point 28 may be configured to transmit and receive packets to and from different stations in any given SMG at different rates, and to adjust these rates so as to optimize performance of the entire group. Typically, the rate chosen for each station is the highest possible rate among all supported rates (i.e., supported by both the access point and the station) that can still provide reliable data transfer. The received power and error statistics stored in SDB 166 for each station are typically used in choosing the transmission rate. It is desirable that these parameters be updated regularly during communication between access point 28 and the stations in WLAN 20, so that the transmission rates may be adjusted accordingly.

In SDM transmission, the rate per station is dependent on the number of members in the SMG, referred to hereinbelow as the SDM order. As the SDM order increases, the overall transmission power is divided among more stations, so that each station receives less power, and the interference between multiplexed transmissions is higher. These two effects lower the signal/noise ratio (SNR) at the receiving station, which in turn leads to lower transmission rates. In an embodiment of the present invention, described hereinbelow, STS 60 determines the transmission rate to be used for each station based on the SDM order, and may subsequently adjust the rate to adapt to variations in link conditions.

To determine the transmission rate for a given station, STS 60 reads the most recent measurement of received power from the station in SDB 166, and uses the power reading to index a lookup table, which gives the appropriate SDM rate. (See Table I, below, for an example of a lookup table that is applicable to an 802.11g network.) The table, which is precalculated and saved in the memory of access point 28, contains rate listings for each possible SDM order and is common to all stations. In order to read the appropriate table entry, STS 60 applies a predetermined offset to the power reading, so as to convert the station power (typically given in dBm power units) to the appropriate table index. This offset, referred to herein as the initial SDM working point, is common to all the stations and reflects the decrease of SNR due to the SDM operation of access point 28. This method of determining transmission rate is memory-efficient, since it is based on a common lookup table for all stations, and the table itself is not too large. The method is also computationally efficient, since conversion between the measured signal power and table index is a simple linear operation.

STS 60 adjusts the SDM working point (which determines the transmission speed) for access point 28 (rather than for a specific station) by increasing or decreasing the predetermined initial working point by a certain power offset in dB. The offset can be set differently for raising the working point and for lowering it, and can also be set separately for each SDM order. The adjustment of the working point is based on cumulative statistics of successes and failures of SDM transmissions. These statistics can be separately collected for each SDM order, to support separate adjustment of the working point for each order.

The statistics used in adjusting the SDM working point are derived from status reports regarding actual SDM transmissions. An SDM transmission is determined to have failed if the access point did not receive acknowledgement from the destination station after sending a packet. A transmission is determined to have succeeded if all packets in a given SDM transmission were acknowledged. These success and failure indications are collected in a sliding window (containing the last $N_{Ti}$ trials of $i^{th}$ order SDM transmission), so that only recent entries are taken into account in the error statistics, while old statistics are discarded. If the ratio of the total number of successes to the total number of SDM transmissions ($N_{si}/N_{Ti}$) is greater than a predetermined threshold, the working point is increased. On the other hand, if the ratio of the total number of failures to total number of SDM transmissions ($N_{Fi}/N_{Ti}$) is greater than another (typically different) predetermined threshold, the working point for this $i^{th}$ order SDM is decreased.

When link conditions deteriorate, and the working point decreases, it may occur that none of the stations in the SMG can participate in SDM transmission at the present SDM order, or that not enough statistics will be collected for this SDM order to permit ongoing adjustment of the working point. In this situation, it might be impossible to increase the working point even after link conditions improve. To avoid this eventuality, STS 60 may have a timing mechanism, according to which the SDM working point per SDM order may be raised whenever a timer reaches a predetermined timeout, regardless of SDM performance. This mechanism is active only when the working point is below the initial working point. The timeout value should be large enough to avoid oscillations of the working point. This mechanism can take advantage of existing timers that are mandated by the 802.11 standard.

Figure 14:
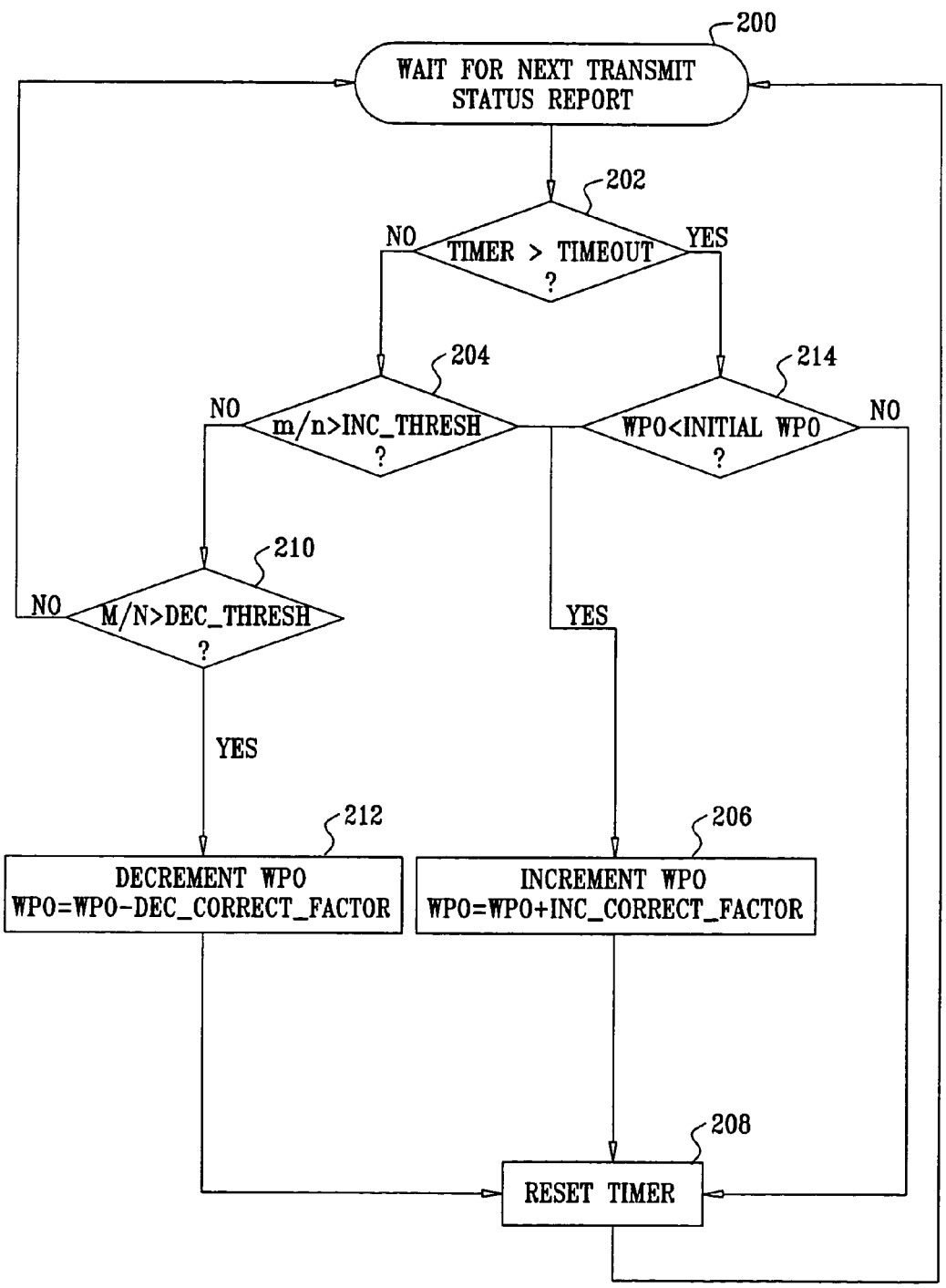
FIG. 14 is a flow chart that schematically illustrates a method for setting a working point offset used in transmission rate adjustment, in accordance with an embodiment of the present invention.

FIG. 14 is a flow chart that schematically illustrates a method for adjusting the working point offset (WPO), in accordance with an exemplary embodiment of the present invention based on the principles described above. WPO is set to a predetermined initial value at power-up. In this example, a timer measures the time elapsed since the last reset, up to a predetermined timeout value. Respective sliding windows, which may be of the same size or different sizes, are defined for both successes and failures. N is the total number of trials (i.e., packets transmitted) inside the current failure window, while M is the number of failures in the failure window. Similarly, n is the total number of trials inside the current success window, while m is the number of successes in the success window. The method uses empirically-chosen correction factors, dec_correct_factor and inc_correct_factor, and thresholds, dec_thresh and inc_thresh, in determining when and by how much to decrement or increment WPO depending on the ratios N/M and n/m.

STS 60 receives periodic status reports from MAC processor 58, at a transmission report step 200. Each report indicates that one or more SDM transmission trials have been carried out, and tells how many trials have succeeded or failed. STS 60 checks the timer, at a timing step 202. As long as the timer has not yet expired, the STS checks the success ratio m/n against the incrementation threshold, at a success checking step 204. If the ratio is over threshold, the STS increments WPO by the incrementation correction factor, at an incrementation step 206. The timer is then reset, at a timer reset step 208, and the STS returns to step 200 to wait for the next report.

On the other hand, if the success ratio is found not to be over threshold at step 204, the STS next checks the failure ratio M/N against the decrementation threshold, at a failure checking step 210. If this ratio is not over threshold either, the STS similarly returns to step 200. If the failure ratio is over threshold, however, the STS decrements WPO by the decrementation correction factor, at a decrementation step 212. The timer is then reset at step 208, and the STS returns to step 200 to wait for the next report.

When a timeout is found to have occurred at step 202, STS 60 checks the current WPO value against the initial WPO value, at a WPO value checking step 214. If the current WPO value is equal to or greater than the initial value, the STS simply resets the timer at step 208 and returns to step 200. If the WPO is less than the initial value, however, the STS increments the WPO at step 206, before resetting the timer and returning to step 200 to wait for the next report.

Table I below schematically illustrates an exemplary transmission rate lookup table, in accordance with an embodiment of the present invention:

TABLE I

CONVERSION BETWEEN POWER AND TRANSMISSION RATE

| Received Measured Power [dB] | $1^{st}$ order SDM Rate [Mbps] | $2^{nd}$ order SDM Rate [Mbps] | $3^{rd}$ order SDM Rate [Mbps] | $4^{th}$ order SDM Rate [Mbps] |
|---|---|---|---|---|
| 1 | 5.5 | 5.5 | 2 | 2 |
| 2 | 6 | 5.5 | 5.5 | 2 |
| 3 | 9 | 5.5 | 5.5 | 5.5 |
| 4 | 11 | 6 | 5.5 | 5.5 |
| 5 | 12 | 6 | 6 | 6 |
| 6 | 12 | 6 | 6 | 6 |
| 7 | 18 | 9 | 9 | 9 |
| 8 | 18 | 11 | 11 | 11 |
| 9 | 18 | 12 | 12 | 12 |
| 10 | 24 | 12 | 12 | 12 |
| 11 | 24 | 12 | 12 | 12 |
| 12 | 24 | 18 | 18 | 18 |
| 13 | 24 | 18 | 18 | 18 |
| 14 | 36 | 18 | 18 | 18 |
| 15 | 36 | 18 | 18 | 18 |
| 16 | 36 | 24 | 24 | 24 |
| 17 | 36 | 24 | 24 | 24 |
| 18 | 48 | 24 | 24 | 24 |
| 19 | 54 | 24 | 24 | 24 |
| 20 | 54 | 36 | 24 | 24 |
| 21 | 54 | 36 | 24 | 24 |
| 22 | 54 | 36 | 36 | 36 |
| 23 | 54 | 36 | 36 | 36 |
| 24 | 54 | 48 | 36 | 36 |
| 25 | 54 | 54 | 36 | 36 |
| 26 | 54 | 54 | 36 | 36 |
| 27 | 54 | 54 | 48 | 36 |
| 28 | 54 | 54 | 54 | 48 |
| 29 | 54 | 54 | 54 | 54 |
| 30 | 54 | 54 | 54 | 54 |
| . | . | . | . | . |
| . | . | . | . | . |
| . | . | . | . | . |
| 127 | 54 | 54 | 54 | 54 |
| 128 | 54 | 54 | 54 | 54 |

TABLE I-continued

CONVERSION BETWEEN POWER AND TRANSMISSION RATE

Based on Table I, some exemplary scenarios are presented hereinbelow, in order to illustrate the procedure of transmission rate adjustment.

Example 1

Setting Second Order SDM Rate for a Specific Station

The initial second order SDM working point offset is set to 87 dB. A signal from a station is received, and its measured beamformed power is −76 dBm. The measured power is converted to table index by adding the working point offset (WPO) to the measured power. Hence, the table index is −76+87=11. The initial rate to be used for transmission to this station in a second order SMG is therefore equal to 12 Mbps, as given by in the middle column of Table I.

Example 2

Working Point Adjustment for Second Order SDM

In this example, the decrementation threshold dec_thresh is set to 20%, and the decrementation correction factor dec_correct_factor is set to 5 dB. Continuing from the previous example, at a certain time, the number of failing second order SDM transmissions is found to be 41 out of 200 trials (for the entire system, rather than a specific station). Thus, the ratio of failures to total trials, M/N, is above the determined threshold. In this case, WPO is decreased by 5 dB, after which the new second order SDM offset becomes 87 dB−5 dB=82 dB. Once again, a station is received with measured beamformed power equal to −76 dBm. Converting measured power to table index gives −76+82=6, so that the rate for the next transmission to this station, in SDM of order 2, is decreased to 6 Mbps.

Example 3

Increasing working point for second order SDM Due to Timeout

A predetermined timeout is set for each SDM order. Let the second order SDM timeout value be set to 5 min. As noted above, if the timer reaches the timeout value (at step 202 in FIG. 14) before another adjustment occurs, WPO is increased, regardless of the second order SDM performance, but only if the working point offset is found to be below the initial WPO. The incrementation correction factor inc_correct_factor is set, for example, to 2 dB.

Continuing from the previous example, we assume that very few statistics are accumulated, since second order SDM is almost not used. Therefore, the timer reaches the 5 min timeout before another working point adjustment has occurred. As a result, the WPO is increased by 2 dB, and the new WPO, for second order SDM, now becomes 82 dB+2 dB=84 dB. If a station is received with measured power equal to −76 dBm, the corresponding table index equals −76+84=8. Thus, the rate of the next second order SDM transmission to that station will be increased to 11 Mbps.

As noted above, the transmission rate that a given station can support may be a factor in deciding whether to include the station in the current SMG, at step 190 (FIG. 13). For this purpose, STS 60 reads the SDM rates from the appropriate lookup table, according to the most recent measurement of power received from the station. If the SDM rate of the station for the applicable SDM order is lower than a predetermined threshold rate for that SDM order, the station is excluded from the SMG. Typically, the station will be excluded from any SMG of this SDM order, as well as any SMG of higher SDM order.

Although the embodiments described above refer specifically to aspects of the 802.11 standards, the principles of the present invention may similarly be applied to WLANs that operate according to other standards and to other sorts of wireless packet networks. The terms "access point" and "station," which are used in the present patent application and in the claims, are drawn from the conventional language that is used in the 802.11 standards. These terms should be understood, however, to apply more generally to any sort of wireless packet network base station and client unit, respectively, to which the principles of the present invention may be applied.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication over a wireless local area network (WLAN), comprising:
   receiving uplink signals from a plurality of stations in the WLAN;
   placing data packets in respective queues for downlink transmission to the stations;
   responsively to the uplink signals and to a characteristic of the respective queues, selecting a set of the stations for inclusion in a spatial multiplexing group; and
   transmitting downlink signals so as to convey the data packets from the respective queues simultaneously to the stations in the set using spatial division multiplexing (SDM),
   wherein selecting the set of the stations comprises processing the uplink signals to determine respective spatial signatures of the stations, and grouping the stations in the set responsively to the spatial signatures,
   wherein selecting the set of the stations comprises processing the uplink signals to determine respective spatial signatures of the stations, and grouping the stations in the set responsively to the spatial signatures.

2. The method according to claim 1, wherein calculating the respective beamforming weights comprises computing receive beamforming weights and transmit beamforming weights, wherein the transmit beamforming weights are applied to the downlink signals, and wherein receiving the uplink signals comprises applying the receive beamforming weights to the uplink signals.

3. The method according to claim 2, wherein receiving the uplink signals comprises receiving first and second uplink signals simultaneously from at least first and second stations in the spatial multiplexing group, and wherein applying the receive beamforming weights comprises using the beamforming weights to separate and demodulate the first and second uplink signals simultaneously.

4. The method according to claim 1, wherein grouping the stations comprises selecting the stations for inclusion in the group such that there is a substantial difference between the respective spatial signatures of all the stations in the group.

5. The method according to claim 1, wherein receiving the uplink signals comprises measuring respective power levels of the uplink signals, and wherein selecting the set of the stations comprises grouping the stations in the set responsively to the power levels.

6. The method according to claim 5, wherein grouping the stations comprises selecting a first station having a first power level, and selecting at least a second station so that the respective power levels of the uplink signals of all the stations in the set are within a predefined bound of the first power level.

7. The method according to claim 1, wherein the queues have respective lengths, and wherein grouping the stations comprises selecting a first station having a first queue length, and selecting at least a second station so that the respective queue lengths of all the stations in the set are within a predefined bound of the first queue length.

8. The method according to claim 1, wherein the data packets have respective packet lengths, and wherein grouping the stations comprises selecting a first station having a first packet for transmission having a first packet length, and selecting at least a second station so that the respective packet lengths of the packets to be transmitted to all the stations in the set are within a predefined bound of the first packet length.

9. The method according to claim 1, wherein selecting the set of the stations comprises assigning respective priorities to the queues, and choosing at least one of the stations for inclusion in the group responsively to the priorities.

10. The method according to claim 9, wherein assigning the respective priorities comprises calculating the priorities responsively to at least one of a load of the queues, an age of a first packet, and a length of the first packet in each of the queues.

11. The method according to claim 1, wherein transmitting the downlink signals comprises determining respective transmission rates for the stations responsively to the uplink signals, and wherein selecting the set of the stations comprises grouping the stations in the set responsively to the respective transmission rates.

12. The method according to claim 11, wherein selecting the set of the stations comprises determining a number of the stations to be included in the set, and wherein determining the respective transmission rates comprises setting the respective transmission rates responsively to the number of the stations in the set.

13. The method according to claim 1, wherein transmitting the downlink signals comprises calculating beamforming weights responsively to the uplink signals, and applying the beamforming weights to the downlink signals.

14. The method according to claim 13, wherein calculating the beamforming weights comprises calculating first beamforming weights for application to the uplink signals and second beamforming weights for application to the downlink signals, and wherein receiving the uplink signals comprises applying the first beamforming weights so as to enhance reception of the uplink signals.

15. The method according to claim 1, wherein selecting the set of the stations comprises selecting a first set of the stations for inclusion in a first spatial multiplexing group, to which the downlink signals are to be transmitted during a first period, and comprising selecting a second set of the stations for inclusion in a second spatial multiplexing group, and transmitting the downlink signals simultaneously to the stations in the second set using the SDM during a second period, subsequent to the first period.

16. The method according to claim 1, wherein receiving the uplink signals comprises permitting the stations in the WLAN to transmit uplink signals during a first operating period, subject to a collision-avoidance mechanism provided by a standard applicable to the WLAN, and wherein transmitting the downlink signals comprises transmitting a broadcast message from an access point to the stations in the WLAN so as to disable transmission of the uplink signals, thereby terminating the first operating period, and transmitting the downlink signals simultaneously to the stations in the set using SDM during a second operating period immediately following the broadcast message.

17. The method according to claim 1, wherein receiving the uplink signals comprises receiving uplink signals at an access point in the WLAN via multiple antennas that are coupled to the access point, finding respective correlations between respective sequences of samples of the uplink signals received by the antennas and a known preamble of a packet carried by the uplink signals, and combining the respective correlations from the plurality of the antennas so as to recover a timing of the uplink signals.

18. The method according to claim 1, wherein receiving the uplink signals comprises receiving uplink signals at an access point in the WLAN via multiple antennas that are coupled to the access point, tracking respective phases of the uplink signals received by the antennas, and combining the respective phases from the plurality of the antennas so as to recover at least one of a carrier frequency offset and an instantaneous carrier phase of the uplink signals.

19. The method according to claim 1, wherein receiving the uplink signals comprises receiving the uplink signals at an access point in the WLAN via multiple antennas that are coupled to the access point, wherein the access point comprises at least first and second transceivers, which are coupled to respective antennas among the multiple antennas and have respective response characteristics, and wherein the method comprises making a measurement of the response characteristics of at least one of the first and second transceivers by transmitting a calibration signal from the first transceiver to the second transceiver via the respective antennas, and modifying the uplink signals received by the access point responsively to the measurement so as to compensate for an imperfection in the response characteristics.

20. The method according to claim 19, wherein the imperfection comprises a mismatch in the respective response characteristics of at least one of the first and second transceivers.

21. The method according to claim 1, wherein receiving the uplink signals comprises receiving the uplink signals at an access point in the WLAN via multiple antennas that are coupled to the access point, wherein the access point comprises multiple transceivers, which are respectively coupled to the antennas and comprise respective local oscillators, and which generate respective baseband signals responsively to the uplink signals, the baseband signals having respective phases that are determined by the respective local oscillators, and wherein the method comprises providing a reference signal to the transceivers so as to synchronize the phases of the baseband signals provided by the multiple transceivers.

22. A method for communication over a wireless local area network, comprising:

prompting a plurality of stations in the WLAN to transmit respective uplink signals such that the stations transmit the uplink signals in a predetermined sequence;

receiving the uplink signals from the stations in the predetermined sequence;

responsively to the first uplink signals, determining respective spatial signatures of the stations;

calculating beamforming weights based on the spatial signatures; and

Communicating with two or more of the stations simultaneously by spatial division multiplexing (SDM) using the beamforming weights, wherein prompting the stations comprises causing the stations to transmit the uplink signals at intervals selected so that at least some of the uplink signals overlap in time.

23. The method according to claim 22, wherein prompting the stations comprises causing each of the stations to transmit the uplink signals within a respective, predetermined time window.

24. The method according to claim 22, wherein receiving the first signals comprises sending a broadcast message so as to disable uplink transmission by the stations in the WLAN for a predetermined period, and wherein prompting the stations comprises sending a second message, following the broadcast message, to each of the stations in the predetermined sequence.

25. The method according to claim 22, wherein receiving the first signals comprises receiving the first signals at multiple antennas of an access point in the WLAN, and wherein determining the respective spatial signatures comprises computing a signature vector responsively to the first signals received by each of the antennas.

26. The method according to claim 25, wherein computing the signature vector comprises, for each station among the plurality of stations, finding a correlation between a sequence of samples of the signals received by each of the antennas and a known preamble of a packet carried by the first signals.

27. The method according to claim 26, and comprising combining the respective correlations from the plurality of the antennas so as to recover a timing of the first signals.

28. The method according to claim 25, and comprising tracking respective phases of the first signals received by the antennas, and combining the respective phases from the plurality of the antennas so as to recover a carrier frequency offset of the first signals.

29. The method according to claim 25, wherein the access point comprises at least first and second transceivers, which are coupled to respective antennas among the multiple antennas and have respective response characteristics, and wherein the method comprises making a measurement of the response characteristics of at least one of the first and second transceivers by transmitting a calibration signal from first transceiver to the second transceiver via the respective antennas, and modifying uplink signals received by the access point responsively to the measurement so as to compensate for an imperfection in the response characteristics.

30. The method according to claim 29, wherein the imperfection comprises a mismatch in the respective response characteristics of the first and second transceivers.

31. The method according to claim 25, wherein the access point comprises multiple transceivers, which are respectively coupled to the antennas and comprise respective local oscillators, and which generate respective baseband signals responsively to uplink signals received via the antennas, the baseband signals having respective phases that are determined by the respective local oscillators, and wherein the method comprises providing a reference signal to the transceivers so as to synchronize the phases of the baseband signals provided by the multiple transceivers.

32. The method according to claim 22, wherein calculating the beamforming weights comprises orthogonalizing the spatial signatures of the two or more of the stations.

33. The method according to claim 22, wherein communicating with the two or more of the stations comprises exchanging second signals with the stations, and wherein calculating the beamforming weights comprises determining the beamforming weights so that application of the beamforming weights to the second signals causes a distortion of the second signals to be reduced.

34. The method according to claim 33, wherein calculating the beamforming weights comprises determining the beamforming weights so that application of the beamforming weights to the second signals causes an interference between the second signals to be reduced.

35. The method according to claim 34, wherein determining the beamforming weights comprises minimizing a cost function having a first term corresponding to the distortion and at least a second term corresponding to the interference, wherein different, respective weight factors are assigned to the first and second terms in the cost function.

36. The method according to claim 22, wherein communicating with the two or more of the stations comprises exchanging second signals with the stations, and wherein calculating the beamforming weights comprises determining the beamforming weights so that application of the beamforming weights to the second signals causes an interference between the second signals to be reduced.

37. The method according to claim 22, and comprising receiving at least one interfering signal from a source other than the plurality of the stations, and wherein calculating the beamforming weights comprises determining the beamforming weights so that application of the beamforming weights to the second signals causes an interference due to the at least one interfering signal to be reduced.

38. The method according to claim 22, wherein communicating with the two or more of the stations comprises transmitting downlink signals to the stations and receiving uplink signals from the stations, and wherein calculating the beamforming weights comprises calculating first beamforming weights for application to the uplink signals and second beamforming weights for application to the downlink signals, wherein the second beamforming weights are different from the first beamforming weights.

39. The method according to claim 38, wherein calculating the second beamforming weights comprises computing respective transmit beamforming weights for application to the downlink signals that are to be transmitted to each of the two or more of the stations, and optimizing the transmit beamforming weights jointly for all of the two or more of the stations so as to reduce an interference between the downlink signals received by each of the two or more of the stations.

40. The method according to claim 22, wherein receiving the first signals comprises permitting the stations in the WLAN to transmit uplink signals during a first operating period, subject to a collision-avoidance mechanism provided by a standard applicable to the WLAN, and wherein communicating with the two or more of the stations comprises transmitting a broadcast message from an access point to the stations in the WLAN so as to disable transmission of the uplink signals, thereby terminating the first operating period, and transmitting downlink signals simultaneously to the two or more of the stations using the beamforming weights during a second operating period immediately following the broadcast message.

41. A method for communication over a wireless local area network (WLAN), comprising:

selecting a set of stations in the WLAN for inclusion in a spatial multiplexing group;

during a first operating period, permitting the stations in the WLAN to transmit uplink signals subject to a collision-avoidance mechanism provided by a standard applicable to the WLAN;

transmitting a broadcast message from an access point to the stations in the WLAN so as to disable transmission of the uplink signals, thereby terminating the first operating period; and during a second operating period immediately following the broadcast message, transmitting downlink signals from the access point simultaneously to the stations in the spatial multiplexing group using spatial division multiplexing (SDM), wherein transmitting the broadcast message comprises specifying, in the broadcast message, a duration of the second operating period, wherein upon a conclusion of the specified duration, the stations in the WLAN are permitted to resume transmission of the uplink signals.

42. The method according to claim 41, wherein the standard applicable to the WLAN comprises an IEEE 802.11 interface (transreceiver).

43. The method according to claim 42, wherein transmitting the broadcast message comprises transmitting a Clear-to-Send (CTS) message.

44. The method according to claim 43, wherein transmitting the broadcast message comprises transmitting a delivery traffic indication message (DTIM) prior to the CTS message.

45. The method according to claim 41, wherein transmitting the broadcast message comprises repeating transmission of the broadcast message periodically, at predetermined intervals, so as to define successive downlink and uplink transmission periods within the WLAN.

46. A method for communication over a wireless local area network (WLAN), comprising:

receiving uplink signals at an access point from at least one station in the WLAN via multiple antennas that are coupled to the access point;

finding respective correlations between respective sequences of samples of the uplink signals received by the antennas and a known preamble of a packet carried by the uplink signals;

tracking respective phases of the uplink signals received by the antennas;

combining the respective correlations from the plurality of the antennas so as to recover a timing of the uplink signals; and combining the respective phases from the plurality of the antennas so as to recover a carrier frequency offset and a carrier phase of the uplink signals.

47. The method according to claim 46, wherein receiving the uplink signals comprises receiving the uplink signals from a plurality of stations in the WLAN, and communicating with two or more of the stations simultaneously by spatial division multiplexing (SDM), responsively to the recovered timing, carrier frequency offset and carrier phase.

48. The method according to claim 46, wherein combining the respective correlations comprises computing a sum of the respective correlations so as to find the timing that maximizes the sum.

49. The method according to claim 46, wherein combining the respective correlations comprises finding the timing that maximizes a plurality of the respective correlations.

50. The method according to claim 46, wherein combining the respective phases comprises summing the respective phases.

51. The method according to claim 50, wherein summing the respective phases comprises measuring respective powers of the uplink signals, weighting the respective phases responsively to the respective powers, and summing the weighted respective phases.

52. A method for communication over a wireless local area network (WLAN), comprising:
   selecting a number of stations in the WLAN for inclusion in a spatial multiplexing group;
   determining a downlink transmission rate for the spatial multiplexing group responsively to the number of the stations in the group; and
   transmitting downlink signals simultaneously to the stations in the spatial multiplexing group using spatial division multiplexing (SDM) at the downlink transmission rate,
   wherein determining the downlink transmission rate comprises measuring a level of uplink signals received from the stations in the spatial multiplexing group, and selecting the downlink transmission rate from a table using an index determined by the level of the uplink signals,
   wherein the table comprises different lists of entries corresponding to different numbers of the stations that may be included in the spatial multiplexing group.

53. The method according to claim 52 wherein selecting the downlink transmission rate comprises collecting statistics that are indicative of errors in communication between an access point and the stations in the spatial multiplexing group, and adjusting the index responsively to the statistics.

54. The method according to claim 52, and comprising permitting the stations in the WLAN to transmit uplink signals during a first operating period, subject to a collision-avoidance mechanism provided by a standard applicable to the WLAN, and wherein transmitting the downlink signals comprises transmitting a broadcast message from an access point to the stations in the WLAN so as to disable transmission of the uplink signals, thereby terminating the first operating period, and transmitting the downlink signals simultaneously to the stations in the set using SDM during a second operating period immediately following the broadcast message.

55. An access point for communication over a wireless local area network (WLAN), comprising:
   a plurality of transceivers, which are coupled to receive uplink signals via respective antennas from stations in the WLAN;
   control circuitry, which is adapted to place data packets in respective queues for downlink transmission to the stations, and which is adapted, responsively to the uplink signals and to a characteristic of the respective queues, to select a set of the stations for inclusion in a spatial multiplexing group; and
   spatial division multiplexing (SDM) circuitry, which is coupled to the transceivers so as to transmit downlink signals so as to convey the data packets from the respective queues simultaneously to the set of the stations in the spatial multiplexing group,
   wherein the control circuitry is adapted to process the uplink signals to determine respective spatial signatures of the stations, and to group the stations in the set responsively to the spatial signatures,
   wherein the control circuitry is adapted to calculate respective beamforming weights for the stations in the set responsively to the respective spatial signatures, and wherein the SDM circuitry is coupled to apply the beamforming weights to the downlink signals.

56. The access point according to claim 55, wherein the respective beamforming weights comprise receive beamforming weights and transmit beamforming weights, wherein the transmit beamforming weights are applied to the downlink signals, and wherein the SDM circuitry is further coupled to apply the receive beamforming weights to the uplink signals.

57. The access point according to claim 56, wherein the uplink signals comprise first and second uplink signals, which are received simultaneously from at least first and second stations in the spatial multiplexing group, and wherein the SDM circuitry is adapted to apply the receive beamforming weights so as to separate the first and second uplink signals, and wherein the access point comprises demodulating circuitry, which is adapted to demodulate the separated first and second uplink signals simultaneously.

58. The access point according to claim 55, wherein the control circuitry is adapted to select the stations for inclusion in the group such that there is a substantial difference between the respective spatial signatures of all the stations in the group.

59. The access point according to claim 55, wherein the control circuitry is adapted to measure respective power levels of the uplink signals, and to group the stations in the set responsively to the power levels.

60. The access point according to claim 59, wherein the control circuitry is adapted to group the stations by selecting a first station having a first power level, and selecting at least a second station so that the respective power levels of the uplink signals of all the stations in the set are within a predefined bound of the first power level.

61. The access point according to claim 55, wherein the queues have respective lengths, and wherein the control circuitry is adapted to group the stations by selecting a first station having a first queue length, and selecting at least a second station so that the respective queue lengths of all the stations in the set are within a predefined bound of the first queue length.

62. The access point according to claim 55, wherein the data packets have respective packet lengths, and wherein the control circuitry is adapted to group the stations by selecting a first station having a first packet for transmission having a first packet length, and selecting at least a second station so that the respective packet lengths of the packets to be transmitted to all the stations in the set are within a predefined bound of the first packet length.

63. The access point according to claim 55, wherein the control circuitry is adapted to assign respective priorities to the queues, and to select at least one of the stations for inclusion in the group responsively to the priorities.

64. The access point according to claim 63, wherein the control circuitry is adapted to calculate the priorities responsively to at least one of a load of the queues, an age of a first packet, and a length of the first packet in each of the queues.

65. The access point according to claim 55, wherein the control circuitry is adapted to determine respective transmission rates for the stations responsively to the uplink signals, and to group the stations in the set responsively to the respective transmission rates.

66. The access point according to claim 65, wherein the set comprises a number of the stations determined by the control circuitry, and wherein the control circuitry is adapted to set the respective transmission rates responsively to the number of the stations in the set.

67. The access point according to claim 55, wherein the control circuitry is adapted to calculate beamforming weights responsively to the uplink signals, and wherein the SDM circuitry is coupled to apply the beamforming weights to the downlink signals.

68. The access point according to claim 67, wherein the control circuitry is adapted to calculate first beamforming weights for application to the uplink signals and second beamforming weights for application to the downlink signals, and wherein the SDM circuitry is adapted to apply the first beamforming weights so as to enhance reception of the uplink signals.

69. The access point according to claim 55, wherein the control circuitry is adapted to select a first set of the stations for inclusion in a first spatial multiplexing group, to which the downlink signals are to be transmitted during a first period, and to select a second set of the stations for inclusion in a second spatial multiplexing group, and to cause the SDM circuitry to transmit the downlink signals simultaneously to the stations in the second set during a second period, subsequent to the first period.

70. The access point according to claim 55, wherein the control circuitry is configured to permit the stations in the WLAN to transmit uplink signals during a first operating period, subject to a collision-avoidance mechanism provided by a standard applicable to the WLAN, and to transmit a broadcast message from the access point to the stations in the WLAN so as to disable transmission of the uplink signals, thereby terminating the first operating period, and to cause the SDM circuitry to transmit the downlink signals simultaneously to the stations in the set using SDM during a second operating period immediately following the broadcast message.

71. The access point according to claim 55, wherein the control circuitry is adapted to find respective correlations between respective sequences of samples of the uplink signals received by the transceivers and a known preamble of a packet carried by the uplink signals, and to combine the respective correlations from the plurality of the transceivers so as to recover a timing of the uplink signals.

72. The access point according to claim 55, wherein the control circuitry is adapted to track respective phases of the uplink signals received by the transceivers, and to combine the respective phases from the plurality of the transceivers so as to recover at least one of a carrier frequency offset and an instantaneous carrier phase of the uplink signals.

73. The access point according to claim 55, wherein the plurality of the transceivers comprises at least first and second transceivers, which have respective response characteristics, and wherein the control circuitry is adapted to make a measurement of the response characteristics of at least one of the first and second transceivers by transmitting a calibration signal from the first transceiver to the second transceiver via the respective antennas, and to modify the uplink signals received by the access point responsively to the measurement so as to compensate for an imperfection in the response characteristics.

74. The access point according to claim 73, wherein the imperfection comprises a mismatch in the respective response characteristics of at least one of the first and second transceivers.

75. The access point according to claim 73, wherein the transceivers comprise respective local oscillators, and which generate respective baseband signals responsively to the uplink signals, the baseband signals having respective phases that are determined by the respective local oscillators, and wherein the control circuitry is coupled to provide a reference signal to the transceivers so as to synchronize the phases of the baseband signals provided by the multiple transceivers.

76. An access point for communication over a wireless local area network (WLAN), comprising:

a plurality of transceivers, which are coupled to receive first signals via respective antennas from stations in the WLAN;

control circuitry, which is adapted to prompt the stations to transmit respective first signals such that the stations transmit the first signals in a predetermined sequence and, responsively to receiving the first signals in the sequence, to determine respective spatial signatures of the stations and to calculate beamforming weights based on the spatial signatures; and spatial division multiplexing (SDM) circuitry, which is coupled to the transceivers so as to communicate with two or more of the stations simultaneously by spatial division multiplexing (SDM) using the beamforming weights, wherein the control circuitry is adapted to cause the stations to transmit the uplink signals at intervals selected so that at least some of the uplink signals overlap in time.

77. The access point according to claim 76, wherein the control circuitry is adapted to prompt the stations so as to cause each of the stations to transmit the uplink signals within a respective, predetermined time window.

78. The access point according to claim 76, wherein the control circuitry is adapted to send a broadcast message from the access point to the stations so as to disable uplink transmission by the stations in the WLAN for a predetermined period, and to prompt the stations to transmit the first signals by sending a second message, following the broadcast message, to each of the stations in the predetermined sequence.

79. The access point according to claim 76, wherein the respective spatial signatures comprise signature vectors, which are computed by the control circuitry responsively to the first signals received by each of the transceivers.

80. The access point according to claim 79, wherein the control circuitry is adapted to compute a respective signature vector for each station among the plurality of stations by finding a correlation between a sequence of samples of the signals received by each of the transceivers and a known preamble of a packet carried by the first signals.

81. The access point according to claim 80, wherein the control circuitry is adapted to combine the respective correlations from the plurality of the antennas so as to recover a timing of the first signals.

82. The access point according to claim 76, wherein the control circuitry is adapted to track respective phases of the first signals received by the transceivers, and to combine the respective phases from the plurality of the antennas so as to recover a carrier frequency offset of the first signals.

83. The access point according to claim 76, wherein the plurality of the transceivers comprises at least first and second transceivers, and wherein the control circuitry is adapted to make a measurement of the response characteristics of at least one of the first and second transceivers by transmitting a calibration signal from first transceiver to the second transceiver via the respective antennas, and to modify uplink signals received by the access point responsively to the measurement so as to compensate for an imperfection in the response characteristics.

84. The access point according to claim 83, wherein the imperfection comprises a mismatch in the respective response characteristics of the first and second transceivers.

85. The access point according to claim 76, wherein the transceivers comprise respective local oscillators, and are operative to generate respective baseband signals responsively to uplink signals received via the antennas, the baseband signals having respective phases that are determined by the respective local oscillators, and wherein the control circuitry is adapted to provide a reference signal to the transceivers so as to synchronize the phases of the baseband signals provided by the multiple transceivers.

86. The access point according to claim 76, wherein the control circuitry is adapted to calculate the beamforming weights by orthogonalizing the spatial signatures of two or more of the stations.

87. The access point according to claim 76, wherein the control circuitry is adapted to determine the beamforming weights so that application of the beamforming weights to second signals exchanged between the SDM circuitry and the two or more of the stations causes a distortion of the second signals to be reduced.

88. The access point according to claim 87, wherein the control circuitry is adapted to determine the beamforming weights so that application of the beamforming weights to the second signals causes an interference between the second signals to be reduced.

89. The access point according to claim 88, wherein the control circuitry is adapted to determine the beamforming weights by minimizing a cost function having a first term corresponding to the distortion and at least a second term corresponding to the interference, wherein different, respective weight factors are assigned to the first and second terms in the cost function.

90. The access point according to claim 76, wherein the control circuitry is adapted to determine the beamforming weights so that application of the beamforming weights to second signals exchanged between the SDM circuitry and the two or more of the stations causes an interference between the second signals to be reduced.

91. The access point according to claim 76, wherein the control circuitry is adapted to determine the beamforming weights so that application of the beamforming weights to second signals exchanged between the SDM circuitry and the two or more of the stations causes an interference due to at least one interfering signal from a source other than the plurality of the stations to be reduced.

92. The access point according to claim 76, wherein the SDM circuitry is adapted to generate downlink signals for transmission to the stations and to process uplink signals received from the stations, and wherein the control circuitry is adapted to calculate first beamforming weights for application to the uplink signals and second beamforming weights for application to the downlink signals, wherein the second beamforming weights are different from the first beamforming weights.

93. The access point according to claim 92, wherein the control circuitry is adapted to calculate the second beamforming weights for application to the downlink signals that are to be transmitted to each of two or more of the stations, and to optimize the second beamforming weights jointly for all of the two or more of the stations so as to reduce an interference between the downlink signals received by each of the two or more of the stations.

94. The access point according to claim 76, wherein the control circuitry is configured to permit the stations in the WLAN to transmit uplink signals during a first operating period, subject to a collision-avoidance mechanism provided by a standard applicable to the WLAN, and to transmit a broadcast message from the access point to the stations in the WLAN so as to disable transmission of the uplink signals, thereby terminating the first operating period, and to cause the SDM circuitry to transmit the downlink signals simultaneously to the two or more of the stations using the beamforming weights during a second operating period immediately following the broadcast message.

95. An access point for communication over a wireless local area network (WLAN), comprising:

a plurality of transceivers, which are coupled via respective antennas to communicate with stations in the WLAN;

spatial division multiplexing (SDM) circuitry, which is coupled to the transceivers so as to communicate with a set of the stations simultaneously by spatial division multiplexing (SDM); and control circuitry, which is configured to permit the stations in the WLAN to transmit uplink signals during a first operating period, subject to a collision-avoidance mechanism provided by a standard applicable to the WLAN, and to transmit a broadcast message to the stations so as to disable transmission of the uplink signals, thereby terminating the first operating period, and to cause the SDM circuitry to transmit downlink signals simultaneously to the stations in the set during a second operating period immediately following the broadcast message, wherein the broadcast message specifies a duration of the second operating period, wherein the control circuitry is adapted to repeat transmission of the broadcast message periodically, at predetermined intervals, so as to define successive downlink and uplink transmission periods within the WLAN.

96. The access point according to claim 95, wherein the standard applicable to the WLAN comprises an IEEE 802.11 interface (transreceiver).

97. The access point according to claim 96, wherein the broadcast message comprises a Clear-to-Send message.

98. The access point according to claim 97, wherein the broadcast message further comprises a delivery traffic indication message (DTIM), which is transmitted prior to the CTS message.

99. The access point according to claim 95, wherein upon a conclusion of the specified duration, the stations in the WLAN are permitted to resume transmission of the uplink signals.

100. An access point for communication over a wireless local area network (WLAN), comprising:

a plurality of transceivers, which are coupled via respective antennas to receive uplink signals from at least one station in the WLAN; and control circuitry, which is adapted to find respective correlations between respective sequences of samples of the uplink signals received by the antennas and a known preamble of a packet carried by the uplink signals, and to track respective phases of the uplink signals received by the antennas, and to combine the respective correlations from the plurality of the antennas so as to recover a timing of the uplink signals, and to combine the respective phases from the plurality of the antennas so as to recover a carrier frequency offset and a carrier phase of the uplink signals, wherein the control circuitry is adapted to sum the respective phases in order to recover the carrier phase, wherein the control circuitry is adapted to measure respective powers of the uplink signals, to weight the respective phases responsively to the respective powers, and to sum the weighted respective phases.

101. The access point according to claim 100, wherein the transceivers are coupled to receive the uplink signals from a plurality of stations in the WLAN, and comprising spatial division multiplexing (SDM) circuitry, which is adapted to communicate via the transceivers with two or more of the stations simultaneously by SDM, responsively to the recovered timing and carrier phase.

102. The access point according to claim 100, wherein the control circuitry is adapted to compute a sum of the respective correlations so as to find the timing that maximizes the sum.

103. The access point according to claim 100, wherein the control circuitry is adapted to find the timing that maximizes a plurality of the respective correlations.

104. An access point for communication over a wireless local area network (WLAN), comprising: a plurality of transceivers, which are coupled via respective antennas to communicate with stations in the WLAN;

spatial division multiplexing (SDM) circuitry, which is coupled to the transceivers so as to communicate with a number of the stations in a spatial multiplexing group simultaneously by spatial division multiplexing (SDM); and control circuitry, which is adapted to determine a downlink transmission rate for the spatial multiplexing group responsively to the number of the stations in the group, and to cause the SDM circuitry to transmit downlink signals simultaneously to the stations in the spatial multiplexing group using SDM at the downlink transmission rate, wherein the control circuitry is adapted to measure a level of uplink signals received from the stations in the spatial multiplexing group, and to select the downlink transmission rate from a table using an index determined by the level of the uplink signals, wherein the table comprises different lists of entries corresponding to different numbers of the stations that may be included in the spatial multiplexing group.

105. The access point according to claim 104, wherein the control circuitry is adapted to collect statistics that are indicative of errors in communication between the access point and the stations in the spatial multiplexing group, and to adjust the index responsively to the statistics.

106. The access point according to claim 104, wherein the control circuitry is configured to permit the stations in the WLAN to transmit uplink signals during a first operating period, subject to a collision-avoidance mechanism provided by a standard applicable to the WLAN, and to transmit a broadcast message to the stations in the WLAN so as to disable transmission of the uplink signals, thereby terminating the first operating period, and to cause the SDM circuitry to transmit the downlink signals simultaneously to the stations in the set using SDM during a second operating period immediately following the broadcast message.

107. An access point for use in a wireless local area network (WLAN), comprising:
a plurality of antennas;
a plurality of transceivers, each comprising:
a respective receiver, which is coupled to receive uplink radio frequency (RF) signals from a station in the WLAN via a respective one of the antennas;
a down-converter, which is adapted to down-convert the RF signals to baseband signals having a phase; and
a local oscillator, which is coupled to drive the down-converter, thereby determining the phase of the baseband signals;
a digital processing circuit, which is coupled to receive and process the baseband signals simultaneously from the plurality of the transceivers; and
a transceiver controller, which is coupled to provide a reference signal to the transceivers so as to synchronize the phase of the baseband signals provided by the plurality of transceivers to the digital processing circuit,
wherein the transceiver controller is coupled to inject the reference signal into the RF signals, and comprising a phase tracking circuit, which is coupled to measure a phase deviation among the baseband signals by detecting a component of the baseband signals corresponding to the injected reference signal, and to adjust the phase of the baseband signals to compensate for the phase deviation.

108. The access point according to claim 107, wherein the local oscillator of each of the transceivers comprises a phase-locked loop, and comprising a plurality of loop filters, coupled respectively to the phase-locked loop in each of the transceivers so as to enhance a coherency of the local oscillator among the transceivers.

* * * * *